US011122159B1

(12) United States Patent
Alsolami et al.

(10) Patent No.: US 11,122,159 B1
(45) Date of Patent: Sep. 14, 2021

(54) METHOD FOR SMART PHONE CONTROL IN MOVING AUTOMOBILES

(71) Applicant: King Abdulaziz University, Jeddah (SA)

(72) Inventors: Fahad Alsolami, Jeddah (SA); Nada Alruhaily, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/210,748

(22) Filed: Mar. 24, 2021

Related U.S. Application Data

(63) Continuation of application No. 17/114,614, filed on Dec. 8, 2020.

(51) Int. Cl.
*H04M 1/72463* (2021.01)
*H04W 8/22* (2009.01)

(52) U.S. Cl.
CPC ......... *H04M 1/72463* (2021.01); *H04W 8/22* (2013.01)

(58) Field of Classification Search
CPC ............................ H04M 1/72463; H04W 8/22
See application file for complete search history.

(56) References Cited

U.S. PATENT DOCUMENTS

| | | | |
|---|---|---|---|
| 8,290,480 | B2 | 10/2012 | Abramson et al. |
| 9,948,479 | B2 | 4/2018 | Bunker et al. |
| 2011/0151842 | A1 | 6/2011 | Olincy et al. |
| 2011/0207441 | A1 | 8/2011 | Wood |
| 2012/0015690 | A1 | 1/2012 | Miao |
| 2012/0326855 | A1 | 12/2012 | Bantz et al. |
| 2013/0281079 | A1 | 10/2013 | Vidal et al. |
| 2016/0270025 | A1* | 9/2016 | Osann, Jr. ............... H04W 4/12 |
| 2020/0252339 | A1* | 8/2020 | McKeefery ........... H04W 40/22 |

FOREIGN PATENT DOCUMENTS

CN         108688594 A         10/2018

OTHER PUBLICATIONS

Yan Wang, et al., "Determining Driver Phone Use by Exploiting Smartphone Integrated Sensors", IEEE Transactions on Mobile Computing, vol. 1, No. 1, 2014, pp. 1-15.

* cited by examiner

*Primary Examiner* — Marisol Figueroa
(74) *Attorney, Agent, or Firm* — Oblon, McClelland, Maier & Neustadt, L.L.P.

(57) ABSTRACT

A system for controlling smartphones of drivers of moving automobiles including a plurality of smartphones, each smartphone including a GPS unit to record speed and location of smartphone, a driver control application to control access to phone services and social media applications, a low frequency receiver to receive low frequency radio frequency identification, an LF RFID, signal from key fob located within moving automobile, and a computing unit to measure a received signal strength indicator, RSSI, of LF RFID signal, a transmitter to transmit the speed, location, LF RFID signal, and RSSI to a centralized monitor. The centralized monitor includes a computing circuitry to receive the speed, location, LF RFID signal, and RSSI of each smartphone, generate clusters of speeds and locations of smartphones, analyze clusters to determine smartphones located within a particular moving automobile, determine smartphone of driver, and transmit a control signal to the smartphone of the driver.

7 Claims, 12 Drawing Sheets

METHOD FOR SMART PHONE CONTROL IN MOVING AUTOMOBILES

CROSS-REFERENCE TO RELATED APPLICATIONS

The present application is a continuation of Ser. No. 17/114,614, pending, having a filing date of Dec. 8, 2020.

BACKGROUND OF THE INVENTION

Technical Field

The present disclosure is directed to systems and methods for identifying and controlling smartphones of drivers of moving vehicles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Distracted driving is considered to be one of main causes for road traffic injuries. Smartphone usage has been identified as a primary source of driver distraction, as it takes the driver's attention off the road, making automobile occupants, such as drivers and passengers, vulnerable to road crashes. Despite knowing the risk of using smartphones while driving, many drivers tend to use smartphones during driving, for example, for making calls, text messaging, playing media, web browsing, social media browsing, gaming, and for other purposes.

Various solutions have been developed in recent years in order to limit the use of smartphones during driving. A portable electronic device was described in U.S. Patent Application No. US 2013/0281079 A1, "Phone that prevents concurrent texting and driving"; a system for detecting use of a mobile communications device by a user while the user is operating a vehicle was described in U.S. Patent Application No. US 2012/0015690 A1, "Detection of Mobile phone usage"; a One Touch Text Response System was described in U.S. Patent Application No. US 2011/0207441 A1, "One Touch Text Response (OTTER)"; and a cellular system was described in U.S. Patent Application No. US US 2011/0151842 A1, "I am driving/busy" automatic response system for mobile phones", each incorporated herein by reference in its entirety. Further, a method for identification of a driver's smartphone has been described. See: Park, Homin, et al., "*Automatic Identification of Driver's Smartphone Exploiting Common Vehicle-Riding Actions*", IEEE Transactions on Mobile Computing, 2018; Yang, Jie, et al. "*Detecting driver phone use leveraging car speakers*", proceedings of the 17th annual international conference on Mobile computing and networking, *ACM,* 2011; Bo, Cheng, et al. "*You're driving and texting: detecting drivers using personal smartphones by leveraging inertial sensors*", proceedings of the 19th annual international conference on Mobile computing & networking, ACM, 2013; Wang, Yan, et al. "*Sensing vehicle dynamics for determining driver phone use*", proceeding of the 11th annual international conference on Mobile systems, applications, and services, ACM, 2013; Chu, Hon Lung, et al. "*In-vehicle driver detection using mobile phone sensors*", ACM MobiSys. 2011; Johnson, Derick A., and Mohan M. Trivedi. "*Driving style recognition using a smartphone as a sensor platform*" Intelligent Transportation Systems (ITSC), 2011 14th International IEEE Conference on. IEEE, 2011; "Distracted driving", Injury Facts, 2020; Francillon, A., Danev, B. and Capkun, S., "*Relay attacks on passive keyless entry and start systems in modern cars*", proceedings of the Network and Distributed System Security Symposium (NDSS), each incorporated herein by reference in their entirety). However, the systems described in these references and other conventional systems do not have capability to efficiently and accurately identify the smartphones of drivers in order to limit their use when the drivers are driving.

Accordingly, it is one object of the present disclosure to provide systems and methods for identifying and managing the mobile phone of a driver of a moving automobile.

SUMMARY

In an exemplary embodiment, a method for controlling smartphones of drivers of moving automobiles is described. The method includes determining, from GPS data, a speed of each smartphone located in a particular moving automobile; determining, from the GPS data, a location of each smartphone in the particular moving automobile; receiving, by each smartphone in the particular moving automobile, a low frequency radio frequency identification, LF RFID, signal from a key fob of the moving automobile; measuring a received signal strength indicator, RSSI, of the LF RFID signal; transmitting, by each smartphone in the particular moving automobile, the speed, the location, the LF RFID signal, and the RSSI to a centralized monitor; receiving, at the centralized monitor, the speed, the location, the LF RFID signal, and the RSSI of each smartphone located in any of a plurality of moving automobiles; assigning a random number to each smartphone; generating clusters of the speeds and the locations of the smartphones; analyzing the clusters to determine at least one set of smartphones located within a particular moving automobile; identifying a smartphone of a driver of the particular moving automobile based on the LF RFID signal, the RSSI, and a number of smartphones located within the particular moving automobile; and transmitting a control signal to the smartphone of the driver of the particular moving automobile.

In another exemplary embodiment, a system for controlling smartphones of drivers of moving automobiles is described, comprising: a plurality of smartphones, each smartphone located in a moving automobile; wherein each smartphone includes: a GPS unit configured to record a speed and a location of the smartphone; a driver control application configured to control access to phone services and social media applications; a low frequency receiver configured to receive low frequency radio frequency identification, LF RFID, signal from a key fob located within the moving automobile; a computing unit configured to measure a received signal strength indicator, RSSI, of the LF RFID signal; a transmitter configured to transmit the speed, the location, the LF RFID signal, and the RSSI to a centralized monitor; wherein the centralized monitor includes a computing circuitry configured to: receive the speed, the location, the LF RFID signal, and the RSSI of each smartphone located in any of a plurality of moving automobiles; assign a random number to each smartphone; generate clusters of the speeds and the locations of the smartphones; analyze the clusters to determine at least one set of smartphones located within a particular moving automobile; identify a smartphone of a driver of the particular moving automobile based on the LF RFID signal, the RSSI, and a number of smartphones located within the particular moving automobile; and transmit a control signal to the smartphone of the driver of the particular moving automobile.

In another exemplary embodiment, a non-transitory computer readable medium having instructions stored therein that, when executed by one or more processors, cause the one or more processors to perform a method for controlling smartphones of drivers of moving automobiles, comprising: receiving, at a centralized monitor, a speed, a location, and a received signal strength indicator, RSSI, of each smartphone located in any of a plurality of moving automobiles; assigning a random number to each smartphone; generating clusters of the speeds and the locations of the smartphones; analyzing the clusters to determine at least one set of smartphones located within a particular moving automobile; identifying a smartphone of a driver of the particular moving automobile based on the RSSI and a number of smartphones located within the particular moving automobile; and transmitting a control signal to the smartphone of the driver of the particular moving automobile.

The foregoing general description of the illustrative aspect of the present disclosures and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
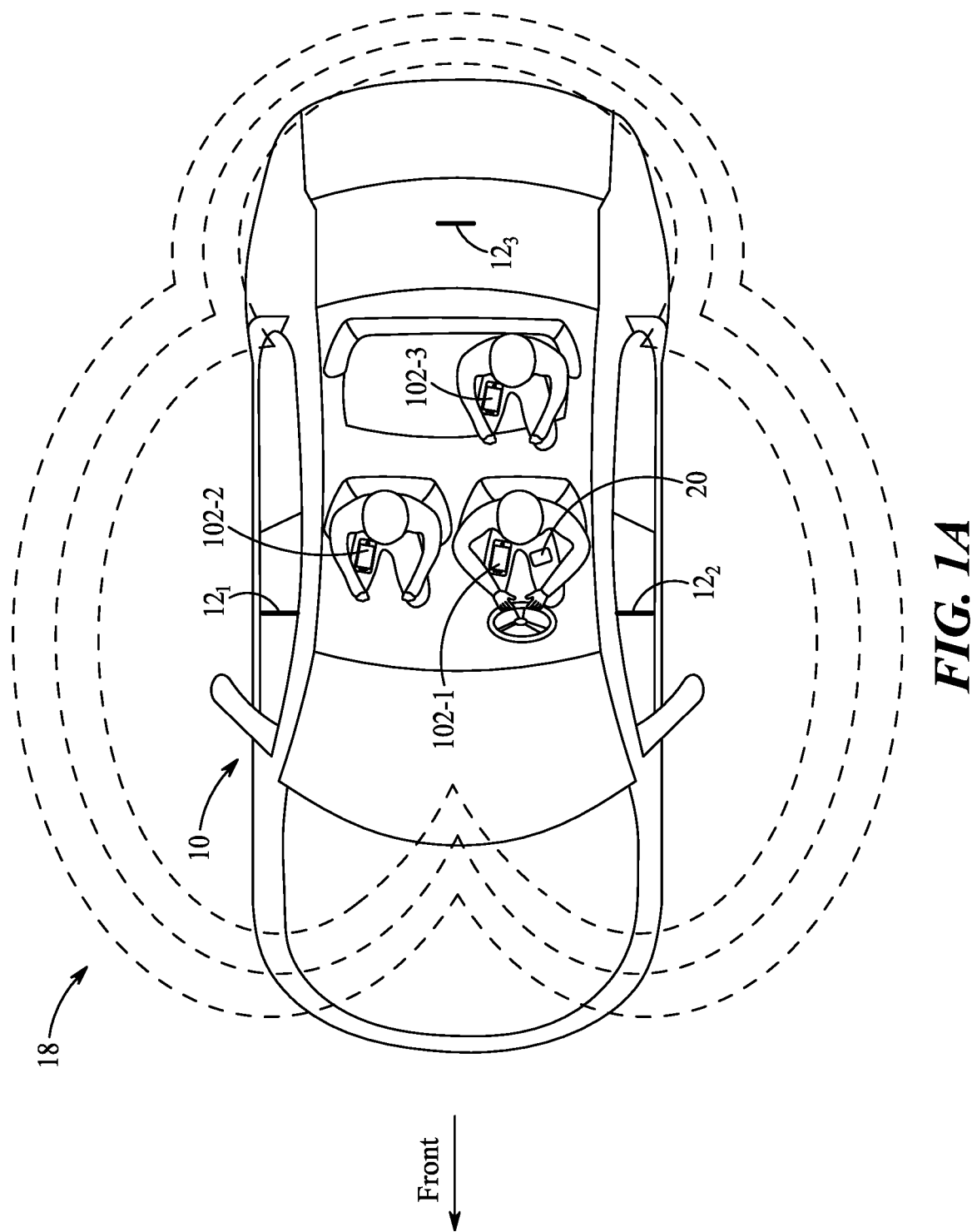
FIG. 1A depicts antenna placement of three antennas in an automobile.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a method and a system for controlling smartphones of drivers of moving automobiles. The present disclosure identifies the smartphones of the drivers and controls them to prevent the drivers from using their smartphones while driving thereby ensuring the safety of the drivers and passengers of the moving automobiles due to smartphone distractions.

FIG. 1A depicts antenna placement in an automobile 10.

Figure 1B:
FIG. 1B depicts an example of protocol realization in a moving automobile.

The automobile 10 is equipped with a passive keyless entry system (also referred to as a smart key system or a proximity key system), allowing a driver of the automobile 10 to control the automobile 10 from a distance using a key fob 20. The key fob 20 typically uses radio frequency identification (RFID) technology for locking, unlocking, and/or starting the automobile 10. In order to localize the key fob 20, the automobile 10 is equipped with a plurality of antennas strategically distributed. As shown in FIG. 1A and FIG. 1B, the automobile 10 may include three antennas $12_1$, $12_2$, and $12_3$ for outside coverage of the automobile 10. The antennas are not limited to antennas $12_1$, $12_2$, and $12_3$. There may be a plurality of antennas on the automobile 10. For example, there may be many antennas spaced about the automobile for better reception of the key fob signal. The distribution and number of antennas depends on the size and geometry of the automobile 10. Also, as shown in FIG. 1A, the driver of the automobile 10 is carrying a smartphone 102-1. Further, a passenger in a right hand front position of the automobile 10 is carrying a smartphone 102-2 and another passenger at a back seat of the automobile 10 is carrying a smartphone 102-3.

When a wake up signal (step 22, FIG. 1B) is sent from the antennas ($12_1$, $12_2$, and $12_3$) to the key fob 20, an electromagnetic field 18 is generated around the automobile 10. RFID communications, as shown in FIG. 1B, between the antennas $12_1$, $12_2$, and $12_3$ and the key fob 20 can be detected by the antennas of a smartphone in the automobile 10.

In an example, when the driver carrying the key fob 20 is in the vicinity of the automobile 10, the antennas $12_1$, $12_2$, and $12_3$ may sense that the key fob 20 (which may be located in the driver's pocket, handbag, hand, etc.) is approaching the automobile 10 and may unlock the doors of the automobile 10. The driver may keep the key fob 20 with himself or herself (for example, in his or her pocket) when unlocking, locking, and/or starting the automobile 10. In some examples, each of the antennas $12_1$, $12_2$, and $12_3$ of the automobile 10 may provide a short-range communication. In situations where the driver of the automobile 10 is within a short-range of the automobile 10, the key fob 20 may receive a challenge from the automobile 10 and a realization protocol may be established in order to unlock the automobile 10. A user device, such as a smartphone, of any of the passengers of the automobile may detect the electromagnetic field generated by the communication between the key fob 20 and the antennas. A measurement of the amplitude of the electromagnetic field 18 as the key fob 20 approaches the automobile 10 may partly determine the position of the key fob 20. When the key fob 20 is inserted in the automobile 10, or otherwise sends a signal to the automobile 10 to start the automobile 10, the communication between the key fob 20 and the automobile 10 may be detected by the antenna of any of the smartphones of the passengers of the automobile 10. This communication will have strongest amplitude near the driver of the automobile 10.

FIG. 1B depicts an example of protocol realization in the automobile 10.

In an example, the automobile 10 may periodically probe for key fob 20. When a trigger event occurs such as approaching the automobile 10 or touching the door handle of the automobile 10, a wake-up signal (a low powered low frequency signal) is transmitted to the key fob 20 from the automobile 10 (step 22). If the key fob 20 is within the range, a realization protocol will be established in order to unlock the automobile 10. In an example, acknowledgment signal (an ultra-high frequency (UHF) identification signal) is sent back to the antennas of the automobile 10 from the key fob 20 (step 24). When the driver is within a short range of the automobile 10, a challenge is sent to the key fob 20 from the automobile 10 (step 26). In an example, the automobile ID is sent to the key fob 20 with the challenge (step 26). If the automobile ID is correct, then a key response is sent to the automobile 10 from the key fob 20 in order to unlock the automobile 10 (step 28). When the realization protocol is successfully completed, the automobile 10 is unlocked.

Figure 1C:
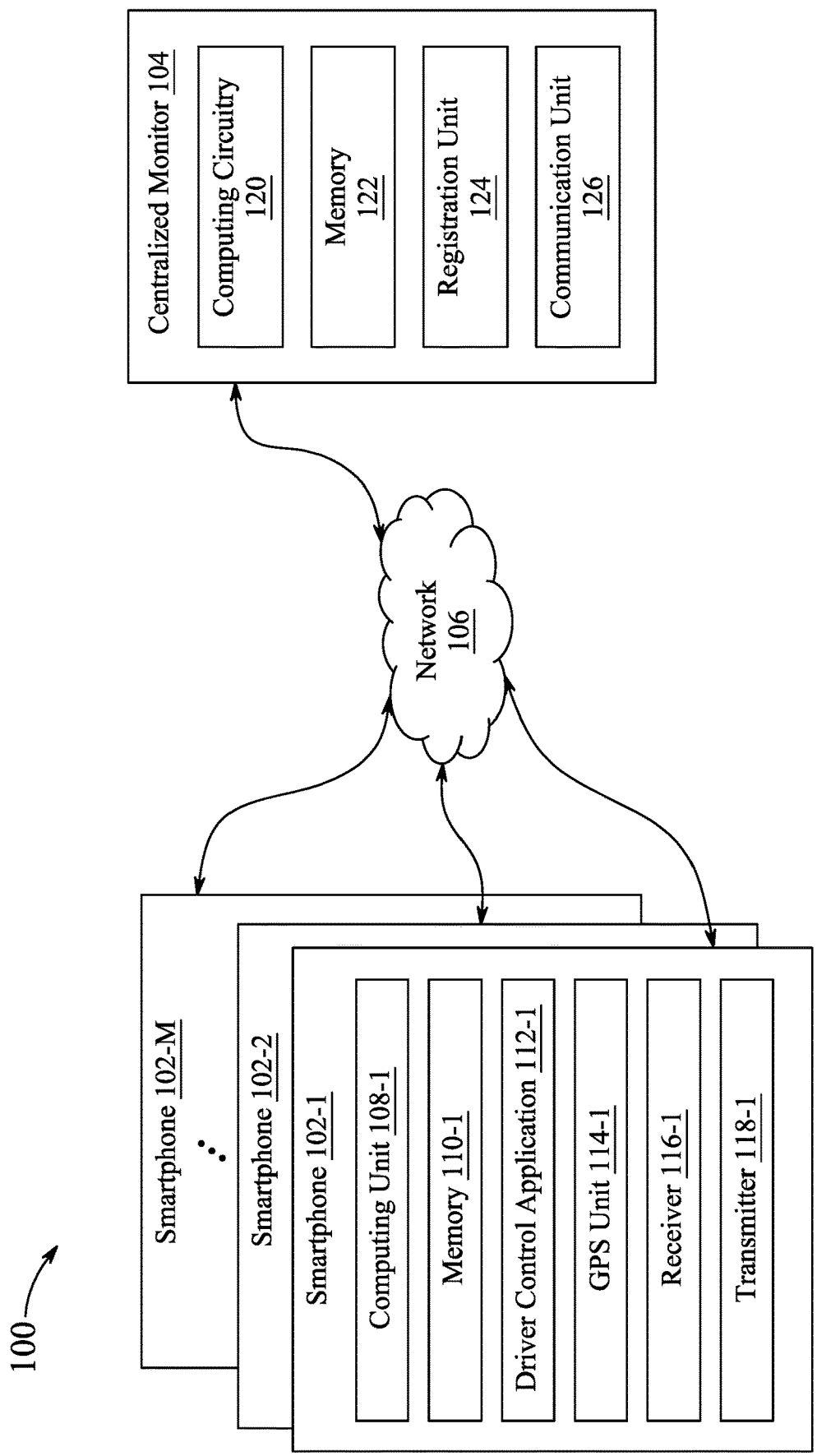
FIG. 1C depicts architecture of a system for controlling smartphones of drivers of moving automobiles, according to exemplary aspects of the present disclosure.

FIG. 1C depicts an architecture of a system 100 for controlling smartphones of drivers of moving automobiles, according to exemplary aspects of the present disclosure.

According to aspects of the present disclosure, the system 100 may include a plurality of user devices such as smartphones 102-(1-M) (hereinafter collectively referred to as smartphone 102, and individually referred to as a smartphone 102), a centralized monitor 104, and a network 106 enabling communication between the system components for information exchange. In an example, each smartphone 102 may be in periodic or ongoing communication with the centralized monitor 104 through the network 106. The user device of the present disclosure is not limited to a smartphone(s). A smartphone is one example of a user device. The user device may be any of a tablet, a personal computer with a hotspot, a smart watch, or the like.

In some aspects of the present disclosure, the user may be a driver or a passenger of a moving automobile (or a vehicle). The smartphone 102 may be any computing device, such as a mobile device, a tablet, a personal digital assistant, a laptop, a smart watch, or any other computing device that is capable of transmitting and receiving data that the user may likely use. Accordingly, each smartphone 102 may be located in a moving automobile. In an example, the smartphones 102 may be located in the same moving automobile. In another example, the smartphones 102 may be located in different moving automobiles. Also, smartphones 102 may be devices from different cellular service providers. A user may use the smartphone 102 to access communication services including internet, voice, and data communication services. The user may also have one or more social media applications or browser installed on smartphone 102 that may enable the user to access web content or social media websites, such as Facebook®, Twitter®, LinkedIn®, and other social media platforms.

According to some aspects of the present disclosure, the centralized monitor 104 may be a server that monitors communications of the smartphones 102 for changes in location (for example, if the smartphones 102 located inside the moving automobiles are moving at or above 20 kilometers per hour) through the network 106. The centralized monitor 104 may be configured to control one or more functionalities/features of the smartphones 102 located in moving automobiles. In an example, the centralized monitor 104 may be a system on a chip (SoC) board.

In an example, the centralized monitor 104 may acquire information (such as speed and location) about the smartphones 102. The centralized monitor 104 may use the acquired information to control one or more functionalities/features of the smartphone 102 of a driver to prevent the driver from using the respective smartphone while driving at or beyond a threshold speed limit "T". In an example, the drivers of the moving automobiles may be prevented from using one or more functionalities/features such as making calls, receiving calls, accessing browser, accessing applications such as music application, accessing a camera and/or social media applications when driving at or beyond the threshold speed limit "T". The threshold speed limit "T" may be set based on various factors such as regulatory requirements, discretion of the owner of the automobile, and the like. To elaborate in one example, the threshold speed limit "T" may be set to 5 kilometers per hour based on a regulatory requirement. In another example, an owner of the logistics truck fleet may set the threshold speed limit "T" at 10 kilometers per hour. In yet another example, a parent may set the threshold speed "T" to 0 kilometer per hour. Other possible factors not discussed herein may be contemplated herein.

In some aspects of the present disclosure, a client-side application associated with the centralized monitor 104, installed in a smartphone 102 of a user, may allow the centralized monitor 104 to manage and control various functionalities/features of the smartphone 102 of the user through the network 106. According to an aspect of the present disclosure, the centralized monitor 104 may be owned or managed or otherwise associated with a law-enforcement agency, a parent, a user device owner, or any entity authorized thereof.

In some aspects of the present disclosure, the network 106 may be a wireless network, a wired network (a smartphone connected to an internet device in an automobile through wires), or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and the like. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

According to some aspects of the present disclosure, the smartphone 102-1 may include a computing unit 108-1 and a memory 110-1. The computing unit 108-1 may be implemented as one or more microprocessors, microcomputers, microcontrollers, digital signal processors, central processing units, graphical processing units, state machines, logic circuitries, and/or any devices that manipulate signals based on operational instructions. Among other capabilities, the computing unit 108-1 may be configured to fetch and execute computer-readable instructions stored in the memory 110-1. In an aspect of the present disclosure, the memory 110-1 may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 110-1 may be capable of storing data and allowing any storage location to be directly accessed by the computing unit 108-1.

According to an aspect of the present disclosure, the smartphone 102-1 may also include a driver control application 112-1. The driver control application 112-1 may interchangeably be referred to as computer application 112-1. The driver control application 112-1 may manage various aspects of the smartphone 102-1, for example, controlling access of the user to phone services and social media applications on the smartphone 102-1. In an aspect of the present disclosure, the driver control application 112-1 may be pre-installed on the smartphone 102-1 or installed on the smartphone 102-1 by default. In some aspects of the present disclosure, the driver control application 112-1 may be a government-mandated application, i.e., it may be mandatory for the user of the smartphone 102-1 to install the driver control application 112-1 on the smartphone 102-1. In an example, the driver control application 112-1 may be a standalone application. In another example, the driver control application 112-1 may be an application integrated into an operating system of the smartphone 102-1.

In some aspects of the present disclosure, the driver control application 112-1 may be a centralized monitor 104 controlled application. In an example, the driver control application 112-1 may be provided on the smartphone 102-1 by the centralized monitor 104. In other aspects of the present disclosure, the driver control application 112-1 may be provided on the smartphone 102-1 by another entity, for example, it may be downloaded from a third-party server. In an example, the user of the smartphone 102-1 may download and install the driver control application 112-1 from an application store. Known examples of application stores include the Google® Play store and the Apple® App store. Once the driver control application 112-1 is downloaded and installed, the driver control application 112-1 on the smartphone 102-1 may acquire device information (for example, international mobile equipment identity (IMEI) number), details of the cellular service provider, personal/private information of the user (for example, identification information such as name of the user, phone number, address, etc.), and/or any other information, upon seeking permission from the user.

In some aspects of the present disclosure, any person on behalf of the user may set up the driver control application 112-1 on the smartphone 102-1. In an example, a parent of the user may set up the driver control application 112-1 on the smartphone 102-1 on the user's behalf. In some examples, the parent may provide information related to a threshold speed limit of the automobile of the user while setting up the driver control application 112-1. In an example, the parent may set a threshold speed limit of the user's automobile to be in a range of about 5 kilometer per hour to about 20 kilometer per hour and input this information when the driver control application 112-1 is set up. In another example, the parent may set a threshold speed limit of the user's automobile to 0 kilometer per hour to ensure that the user does not use the user device when the automobile begins moving.

In an example, the driver control application 112-1 may acquire information of a country, a state, and/or a province of the user. In some examples, the user of the smartphone may be prompted to provide information about his or her automobile, i.e., whether the automobile is a left-hand drive automobile or a right-hand side automobile. In a left-hand drive automobile, the driver is positioned on a front left-side of the automobile and in a right-hand side automobile, the driver is positioned on a front right-side of the automobile.

According to some aspects of the present disclosure, the smartphone 102-1 may further include a global positioning system (GPS) unit 114-1. The GPS unit 114-1 may be configured to record a speed and a location of the smartphone 102-1 located in the moving automobile. In an example, the GPS unit 114-1 may periodically record the speed and the location of the smartphone 102-1. For example, the frequency of recording may be in the order of minutes, seconds, milliseconds, or some other time period. In other examples, the GPS unit 114-1 may record the speed and the location of the smartphone 102-1 at non-periodic time intervals or based on a demand of the driver control application 112-1. In an example, a speed and a location of the moving automobile may be determined from the speed and the location of the smartphone 102-1 recorded by the GPS unit 114-1. In some aspects of the present disclosure, the GPS unit 114-1 may store the GPS data (i.e., the speed and the location of the smartphone 102-1) in the memory 110-1 to be processed further, for example, by the centralized monitor 104.

The manner in which the GPS unit 114-1 records the speed and the location of the smartphone 102-1 is not described in full within this disclosure for the sake of brevity. Also, other ways of estimation and recording of the speed and the location of the smartphone 102-1 are possible and whilst not explicitly discussed, are contemplated herein. In an example, device sensors such as accelerometer, gyroscope, magnetometer, and other such sensors may be used for estimation of the speed and the location of the smartphone 102-1. Also, the smartphone 102-1 may use General Packet Radio Service (GPRS) as an alternative or in addition to GPS unit 114-1 to determine speed and location of the smartphone 102-1. In an example, both the GPS unit 114-1 and the GPRS may be used for accurate determination of the speed and the location of the smartphone 102-1. In some examples, in scenarios where the GPS unit 114-1 is not able to acquire a location (for example, due to obstacles in mountainous regions, buildings or lack of line of sight), the GPRS may be used for such determination.

Referring again to FIG. 1C, the smartphone 102-1 may include a receiver 116-1 and a transmitter 118-1. According to an aspect of the present disclosure, the receiver 116-1 may include a low frequency receiver component configured to receive low frequency signals including low frequency radio frequency identification (LF RFID) signals. A low frequency signal has a frequency in a range from about 30 Kilohertz to about 300 Kilohertz. In some aspects of the present disclosure, the receiver 116-1 may receive a LF RFID signal from a key fob located within the moving automobile in which the smartphone 102-1 is present. A key fob is a passive wireless electronic device that allows a driver of an automobile to control the automobile from a distance. A key fob typically uses RFID technology for locking, unlocking, and/starting an automobile. In an example, the key fob may emit LF RFID signals which may be received/detected by one or more antennas of the automobile.

In an example, when a driver with a key fob is in the vicinity of its automobile, the one or more antennas equipped in the automobile may sense that the key fob (which may be located in the driver's pocket, handbag, hand, etc.) is approaching the automobile and may unlock the doors of the automobile. The driver may keep the key fob with himself or herself (for example, in his or her pocket) when unlocking, locking, and/or starting the automobile. In some examples, the one or more antennas of the automobile may provide a short-range communication. In situations where the driver of the automobile is within a short-range of the automobile, the key fob may receive a challenge from the automobile and a realization protocol may be established in order to unlock the automobile. When the realization protocol is completed successfully and the driver sets inside the automobile, another protocol will follow to start the automobile engine. In some examples, a driver of an automobile may use a digital or a virtual key provided by a manufacturer of the automobile to unlock the automobile and start engine of the automobile.

According to aspects of the present disclosure, the computing unit 108-1 may be configured to measure a received signal strength indicator (RSSI) of the LF RFID signal received by the smartphone 102-1. An RSSI of a signal may be a measurement of the strength of the LF RFID signal received at the smartphone 102-1. In an example, the RSSI is a measurement of a power level received from the response LF RFID signal generated by the key fob when interrogated by antennas of the automobile. The high the RSSI, the closer the key fob is to the smartphone 102-1. The RSSI is measured in decibels (dB). In some aspects of the present disclosure, the computing unit 108-1 may measure the RSSI of the LF RFID signal based on conventional or proprietary methods and techniques. Further, the computing unit 108-1 may store the measured RSSI value of the LF RFID signal in the memory 110-1 in order to be processed further, for example by the centralized monitor 104. In some aspects of the present disclosure, the transmitter 118-1 may be configured to transmit information about the smartphone 102-1 such as the speed, the location, the LF RFID signal, and the RSSI to the centralized monitor 104. In an example, the transmitter 118-1 may transmit the information to the centralized monitor 104 if the automobile in which the smartphone 102-1 is located, is moving at or beyond a threshold speed limit for a pre-defined period of time. According to an aspect of the present disclosure, the transmitter 118-1 may transmit the information through the driver control application 112-1. In an example, the transmitter 118-1 may transmit the information about the smartphone 102-1 to the centralized monitor 104 in response to a request from the centralized monitor 104. In another example, the transmitter 118-1 may transmit the information about the smartphone 102-1 to the centralized monitor 104 as a part of a routine operation.

It should be noted that while FIG. 1C is described with respect to the smartphone 102-1, it should be understood that any number of smartphones 102-2 to 102-M may also interact with the centralized monitor 104 in the manner described herein.

Referring again to FIG. 1C, the centralized monitor 104 may include a computing circuitry 120 and a memory 122. According to an aspect of the present disclosure, the computing circuitry 120 may be implemented as one or more microprocessors, microcomputers, microcontrollers, digital signal processors, central processing units, graphical processing units, state machines, logic circuitries, and/or any devices that manipulate signals based on operational instructions. Among other capabilities, the computing circuitry 120 may be configured to fetch and execute computer-readable instructions stored in the memory 122. In an aspect of the present disclosure, the memory 122 may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 122 may be capable of storing data and allowing any storage location to be directly accessed by the computing circuitry 120.

According to some aspects of the present disclosure, the centralized monitor 104 may include a registration unit 124. The registration unit 124 may be configured to register each smartphone 102 with the centralized monitor 104 based on assigning a unique identification (ID) number to each smartphone 102. In an example, the registration unit 124 may assign the ID numbers in either a serialized manner or a random manner. An ID number that is assigned randomly to a smartphone may be referred to as a random number and an ID number that is assigned serially to a smartphone may be referred to as a serial number. In an example, the random numbers may be pre-generated by the registration unit 124 using existing random number generation algorithms and tools. In an example, the random numbers may be generated as a means of tracking the smartphones anonymously. In other examples, the registration unit 124 may generate the random numbers as and when the smartphones 102 are to be registered with the centralized monitor 104. In some aspects of the present disclosure, a registration process of a smartphone is initiated when a driver control application is downloaded/installed on the smartphone. In some aspects of the present disclosure, the registration unit 124 may be configured to provide permissions to the centralized monitor 104 to control the smartphones 102 with one or more control signals. Although it has been described that the registration unit 124 assigns random numbers to the smartphones 102 and provides permissions to the centralized monitor 104 to control the smartphones 102 with one or more control signals, in some aspects of the present disclosure, the computing circuitry 120 may be configured to assign random numbers to the smartphones 102 and provide permissions to the centralized monitor 104 to control the smartphones 102 with one or more control signals.

Further, in some aspects of the present disclosure, a user of a smartphone may be prompted to login to a particular website to register his or her smartphone with the centralized monitor 104. The user may be prompted to provide his or her country code and phone number to register the smartphone. Once the user provides his or her country code and phone number, the smartphone is registered with the centralized monitor 104. Thereafter, the smartphone may receive a text message including a link for downloading the driver control application. In an example, based on the country code provided by the user, information about the user's automobile could be determined. For example, it could be determined whether the automobile of the user is a left-hand drive automobile or a right-hand side automobile. In a left-hand drive automobile, the driver sits on a front left-side of the automobile and in a right-hand side automobile, the driver sits on a front right-side of the automobile.

In some aspects of the present disclosure, information about the registered smartphones may be stored in the memory 122. In an example, the memory 122 may store a registration directory identifying all smartphones currently registered with the centralized monitor 104. The registration directory may be periodically or dynamically updated as required. According to some aspects of the present disclosure, the centralized monitor 104 may also include a communication unit 126. The communication unit 126 may enable communication between the centralized monitor 104, the smartphones 102, and other devices. In an example, the communication unit 126 may include a modem, a Network Interface Card (NIC), an integrated network interface, a radio frequency transmitter/receiver (e.g., cellular, Bluetooth, NFC), a satellite communication transmitter/receiver, an infrared port, a USB connection, or any other such interfaces for connecting the centralized monitor 104 to the smartphones 102, other computing devices and/or communication networks such as the network 106.

In operation, the centralized monitor 104 may periodically or dynamically receive information from the smartphones 102-(1-M) located in the plurality of moving automobiles. In an example, some of the smartphones 102-(1-M) may be located in the same moving automobile and others may be located in one or more different moving automobiles. The smartphones 102-(1-M) may hereinafter be referred to as smartphones 102-(1-M). In an example, the information received from the smartphones 102-(1-M) may include the speed of each smartphone, the location of each smartphone, the RSSI at each smartphone and other details. In an aspect of the present disclosure, the centralized monitor 104 may retrieve such information from the one or more smartphones. In an example, the centralized monitor 104 may send a request to the smartphones 102-(1-M) for such information. In response to the request, the smartphones may communicate the information (i.e., the speed, the location, and the RSSI) to the centralized monitor 104.

Upon receiving the information about the speed, the location, and the RSSI of each smartphone located in any of the plurality of moving automobiles, the computing circuitry 120 may determine whether the smartphones 102-(1-M) are registered with the centralized monitor 104. In an example, the computing circuitry 120 may determine whether the smartphones 102-(1-M) are registered with the centralized monitor 104 based on the registration directory stored in the memory 122. Once it is determined that the smartphones 102-(1-M) are registered with the centralized monitor 104, the computing circuitry 120 may associate/link the information received from the smartphones 102-(1-M) with the pre-assigned numbers (i.e., ID numbers) of the smartphones 102-(1-M).

In some aspects of the present disclosure, the computing circuitry 120 may apply graph theory to construct a cluster of nodes in which each smartphone is represented as a node on a graph. Each node (i.e., smartphone) has its own location and the location is changeable as each node is moving (considering that the smartphone is located in a moving automobile). Further, each node may be associated with the random number, for example, the ID number pre-assigned to the smartphone. In an example, the movement of each node is recognized if the node is moving equal to or beyond a threshold speed limit over a pre-defined period of time. For example, if the node is moving at more than or equal to 20 kilometers per hour for 20 seconds, then movement of the node is recognized. In some aspects of the present disclosure, the computing circuitry 120 may connect all the nodes together in order to measure the distance between all the nodes.

The computing circuitry 120 may analyze all the nodes to determine which of the smartphones 102-(1-M) are located in the same moving automobile. In some aspects of the present disclosure, the computing circuitry 120 may determine which of the smartphones 102-(1-M) are located in the same moving automobile based on the speed of each smartphone and a distance between each of the smartphones. In an example, if the some of the smartphones 102-(1-M) have identical speeds and distance between them is within a pre-defined limit or a threshold distance of one another or distance between them is less than other smartphones, then it may be determined that those smartphones are located in the same moving automobile. In an example, the threshold distance may be 4 meters.

The computing circuitry 120 may then apply the graph theory to divide all the nodes of the graph into clusters (or subgroups) of the speeds and the locations of the smartphones 102-(1-M) in order to determine which smartphones are in the same moving automobile. In an example, a cluster may represent a moving automobile and nodes in the cluster may represent smartphones located in the moving automobile. In an aspect of the present disclosure, the computing circuitry 120 may generate one or more clusters of the smartphones 102-(1-M) (i.e., nodes) based on the speeds and the distance between the smartphones 102-(1-M). The computing circuitry 120 may arrange the nodes into clusters based on their consistent speeds and relative locations. In an example, the computing circuitry 120 may generate clusters of nodes having identical speeds within a threshold distance of one another. In a non-limiting example, smartphones 102 moving with the speed of 30 kilometers per hour and within 4 meters of one another may be grouped into a first cluster. In another non-limiting example, if four smartphones 102 are determined to be moving with the speed of 30 kilometers per hour and within 4 meters of one another, then the first cluster may include four nodes, each representing a smartphone. In another non-limiting example, smartphones 102 moving with the speed of 40 kilometers per hour and within 4 meters of one another may be grouped into a second cluster. In another non-limiting example, if two smartphones 102 are determined to be moving with the speed of 40 kilometers per hour and within 4 meters of one another, then the second cluster may include two nodes, each representing a smartphone.

According to some aspects of the present disclosure, the computing circuitry 120 may analyze the clusters to determine at least one set of smartphones located within a particular moving automobile from amongst the smartphones 102-(1-M). As may be understood, the one set of smartphones may belong to a single cluster. The computing circuitry 120 may identify a smartphone of a driver in the single cluster of the particular moving automobile. In some aspects, when the driver uses smartphone 102(1-M) to lock/unlock, start the engine and the like, the computing circuitry 120 identifies the smartphone as the driver's smartphone 102(1-M). In some aspects, when the driver does not use the smartphone, but instead uses a key fob to lock/unlock the automobile, the computing circuitry 120 may identify the smartphone 102(1-M) based on the magnitude of the RSSI and the number of smartphones located within the particular moving automobile.

In some aspects of the present disclosure, the computing circuitry 120 may identify/determine the smartphone of the driver of the particular moving automobile within the cluster of nodes (or the one set of smartphones) by determining the highest RSSI signal strength of the nodes in the cluster, based on number of nodes and position of the nodes. In one example, the computing circuitry 120 may identify/determine the smartphone of the driver of the particular moving automobile within the cluster by determining the highest RSSI signal strength of the nodes in the cluster and determining that there is only one node in the cluster. In another example, the computing circuitry 120 may identify/determine the smartphone of the driver of the particular moving automobile within the cluster of nodes (or the one set of smartphones) by determining highest RSSI signal strength of the nodes in the cluster and determining a left most node in the cluster when there are two nodes in the cluster having a same latitude (left-hand drive). In another example, the computing circuitry 120 may identify/determine the smartphone of the driver of the particular moving automobile within the cluster of nodes (or the one set of smartphones) by determining highest RSSI signal strength of the nodes in the cluster and determining a front left node in the cluster. In another example, the computing circuitry 120 may identify/determine the smartphone of the driver of the particular moving automobile within the cluster of nodes (or the one set of smartphones) by determining highest RSSI signal strength of the nodes in the cluster and determining a right most node in the cluster when there are two nodes in the cluster having a same latitude (right-hand drive). In another example, the computing circuitry 120 may identify/determine the smartphone of the driver of the particular moving automobile within the cluster of nodes (or the one set of smartphones) by determining the highest RSSI signal strength of the nodes in the cluster and determining a front right node in the cluster (right-hand drive). In another example, the computing circuitry 120 may identify/determine the smartphone of the driver of the particular moving automobile within the cluster of nodes (or the one set of smartphones) by determining highest RSSI signal strength of the nodes in the cluster and determining a front left node in the cluster (left-hand drive).

According to some aspects of the present disclosure, the computing circuitry 120 may apply a geometric analysis to the cluster to determine if there is only one node in the cluster, to determine the left most node in the cluster when there are two nodes in the cluster having the same latitude (left-hand drive), to determine the front left node in the cluster (left-hand drive), to determine the right most node in the cluster when there are two nodes in the cluster having the same latitude (right-hand drive), and to determine the front right node in the cluster (right-hand drive).

In an example, if there are two nodes in the cluster having consistent speed which are close to each other in distance, the system determines there are two people in the moving automobile, i.e., a driver and a passenger. The computing circuitry 120 may represent these two nodes geometrically as a straight line. In another example, if there are three nodes in the cluster having consistent speed which close to each other in distance, then it may be determined that there are three people in the moving automobile, i.e., a driver and two passengers. The computing circuitry 120 may represent these three nodes geometrically as a triangle. In yet another example, if there are four nodes in the cluster having consistent speed which are close to each other in distance, the determination may be made that there are four people in the moving automobile, i.e., a driver and three passengers.

The computing circuitry 120 may represent these four geometrically as a square, or a rectangle. In some aspects of the present disclosure, the nodes in the cluster may be represented in any other shape depending on how the people are sitting in the moving automobile and a distance between them. Thus, the computing circuitry 120 may create a geometrical shape for the cluster. Once all the geometrical shapes are recognized, the computing circuitry 120 may determine the smartphone of the driver from amongst the smartphones located in the moving automobile.

In an example, if a cluster includes only one node (i.e., a single smartphone) having a consistent speed and no other nodes are there, then it may be determined that there is a single person in the moving automobile. Accordingly, the single node may be identified as the smartphone of the driver of the moving automobile.

In some aspects of the present disclosure, the computing circuitry 120 may determine which node in the cluster has the highest RSSI signal strength. In an example, the node having the highest RSSI signal strength may represent the smartphone of the driver of the moving automobile. In an example, a high RSSI signal strength of an LF RFID signal emitted from a key fob of an automobile that is received by a smartphone may indicate that the key fob and the smartphone are in close proximity to each other. Further, in most cases, since the key fob of the automobile is held by a driver of the automobile, it is highly likely that the smartphone is also held by the driver or is in close proximity of the driver. Accordingly, the node having the highest RSSI signal strength may be identified to be the smartphone of the driver of the moving automobile by the computing circuitry 120. In some examples, the computing circuitry 120 may identify a smartphone of a driver if the RSSI signal strength is above a pre-defined threshold. Further, in addition to using the RSSI, in some examples, the computing circuitry 120 may use additional information such as determining the driver's smartphone from amongst multiple smartphones based on the information such as the country, the state, and/or the province of the user of the smartphone, and whether the automobile of the user is a left-hand drive automobile or a right-hand side automobile. In an example, when the user is driving in the United States, then it may be determined that the moving automobile of the user is a left-hand drive automobile. In such cases, the computing circuitry 120 may identify the left most node in the cluster (when there are two nodes in the cluster having the same latitude) or the front left node in the cluster to be the smartphone of the driver of the moving automobile. In another example, if the user is driving in Australia, then it may be determined that the moving automobile of the user is a right-hand drive automobile. In such cases, the computing circuitry 120 may identify the right most node in the cluster (when there are two nodes in the cluster having the same latitude) or the front right node in the cluster to be the smartphone of the driver of the moving automobile.

According to some aspects of the present disclosure, upon determination of the smartphone of the driver of the particular moving automobile, the communication unit 126 may transmit one or more control signals to the smartphone of the driver of the particular moving automobile. In an example, the communication unit 126 may transmit the one or more control signals to the smartphone when a speed of the particular moving automobile is greater than a threshold value. In a non-limiting example, the threshold value may be 20 kilometers per hour. Accordingly, when the speed of the particular moving automobile is greater than 20 kilometers per hour, the communication unit 126 may transmit one or more controls signal to the smartphone to temporarily disable one or more functionalities/features of the smartphone. In another non-limiting example, the threshold value may be in a range of about 5 kilometers per hour to about 20 kilometers per hour. According to some aspects of the present disclosure, the communication unit 126 may transmit the one or more controls signal to the smartphone of the driver to temporarily disable the one or more functionalities/features of the smartphone as soon the automobile starts moving (i.e., when the speed of the automobile is 0 kilometers per hour). Although the driver is not allowed to make or receive calls if the speed of the particular moving automobile is greater than the threshold value, the driver can receive or make calls if the speed drops below the threshold value.

In some aspects of the present disclosure, the communication unit 126 may transmit the one or more control signals to disable functionalities/features of the smartphone (i.e., the registered smartphone) from receiving calls, making calls, and/or from accessing social media applications when the speed of the particular moving automobile is greater than the threshold value. In an example, the driver of the smartphone may be restricted from making calls except calls to emergency services or emergency units, such as law enforcement and health services during an emergency situation. In an example, the smartphone may not be restricted from accessing navigation applications and other necessary applications, such as Google® map and Uber. In doing so, existing safety risks can be reduced by preventing the driver from using various regular functions of the smartphone that are likely to distract the driver and increase risks while driving.

According to some aspects of the present disclosure, the communication unit 126 may transmit the control signal to the smartphone to actuate the smartphone to call an emergency service or emergency unit when the speed of the particular moving automobile in which the smartphone is located rapidly decreases. In an example, if an automobile is moving with a constant speed and the speed of the automobile rapidly decreases, the determination may be made whether the driver has stopped the automobile intentionally or the automobile has met with an accident.

In an example, the smartphone 102-1 may be identified as the smartphone of the driver of a moving automobile. The receiver 116-1 of the smartphone 102-1 may be configured to receive a component LF RFID signal (for example, a Bluetooth signal) from any one of an airbag sensor of the moving automobile, a brake sensor of the moving automobile, a tire sensor of the moving automobile, an event data recorder of the moving automobile, an accident data recorder of the moving automobile, an electronic control unit alarm of the moving automobile, and a speed sensor of the moving automobile indicating a sudden deceleration. The transmitter 118-1 may be configured to transmit the component LF RFID signal to the centralized monitor 104. Upon receiving the data, the centralized monitor 104 may be configured to analyze the component LF RFID signal to determine whether the data indicates an emergency situation. The centralized monitor 104 may communicate with an emergency unit when an emergency situation is indicated.

In an example, a plurality of sensors are deployed on airbags and brakes of automobiles. Therefore, in the event an automobile is involved in an accident, the centralized monitor 104 may receive an alert notification (or an alarm) that the automobile's airbag has been released, or a brake has been applied with an unusual pressure. The centralized monitor 104 may also receive additional information to be analyzed further which may decrease the chance of false alarms. In an example, the centralized monitor 104 may receive information recorded by the automobile's event data recorder and accident data recorder, which may include statistics and information regarding electronically sensed problems in engine, or sudden change in wheels' speed. Such information could be analyzed on the fly using artificial intelligence (AI) based methods and the possibility of the automobile being involved in an accident may be measured. When it is determined that the automobile may be involved in the accident, the centralized monitor 104 may send a message requiring a help from the emergency unit in order to arrange for an ambulance to take the patients to the hospital.

However, in the situation where the automobile is moving at a constant speed, and suddenly stops without releasing the airbag, or a hard pressure is applied to the brake (i.e. without triggering any sensors), indicate determination may be made that the driver of the automobile has stopped the automobile purposely or the automobile has met with an accident. In such situations, the centralized monitor 104 may send an emergency message to the driver's smartphone to determine if the user is safe. If the driver responds to the emergency message indicating that the user is safe, then it is determined that the driver stopped the automobile on purpose. Otherwise, the centralized monitor 104 determines that there was an accident. The centralized monitor 104 may send communications to emergency health care such ambulance seeking help for the driver and the passengers (if any) of the automobile providing with the last recorded location of the automobile.

According to some aspects of the present disclosure, in a similar manner as described above, the computing circuitry 120 may be configured to identify and control smartphones of drivers of the plurality of moving automobiles. In some aspect of the present disclosure, the manner in which the smartphones are to be controlled may depend on a country specific traffic police regulations. For example, the centralized monitor 104 may control the drivers' smartphones based on the policies and regulations of the country in which the drivers are located. Also, in an example, a police department can use the centralized monitor 104 to investigate crimes. For example, by using the centralized monitor 104, the police department can confirm which smartphone was with a victim or close to the victim before, during, and/or after a crime.

In some examples, the centralized monitor 104 could be integrated in automobiles by automobile manufacturers as a new service to ensure the safety of drivers and passengers. The centralized monitor 104 can determine a class and a type of an automobile through the integration in the automobile. Such an integration will help in estimating a number of people in the automobile in case of an accident, in addition to the providing essential information to the automobile mechanics.

Although the system 100 describes a client-server architecture for controlling the driver's smartphone while driving, in some aspects, driver's smartphone control can be achieved by implementing an application in the smartphone having some or all functionalities of the centralized monitor 104. For example, the application in the smartphone can monitor the speed and the location, measure RSSI, communicate with other smartphones in an automobile to compare the RSSI values and determine a driver's smartphone based on the RSSI values and control functionalities/features of the smartphone when the automobile goes beyond a pre-defined speed. The application may also be configured to determine that the smartphone is a driver's smartphone based on current information including identifying key fob in proximity and historical data that includes history of previous determinations by the application that the smartphone's user drove an automobile.

According to aspects of the present disclosure, the system 100 is a robust system that can accurately and efficiently determine smartphones of drivers from amongst multiple smartphones located in moving automobiles and control the smartphones of the drivers when the moving automobiles in which they are located reach a specific speed limit. Also, the system 100 identifies the driver's smartphone and controls them while ignoring the passenger's smartphones in order to prevent only the drivers from using their smartphones while driving. Accordingly, only the drivers of the moving automobiles are discouraged/prohibited from operating the smartphones while driving. By controlling the driver's usage of smartphones emergencies can be avoided and safety of the drivers and passengers is ensured.

Figure 1D:
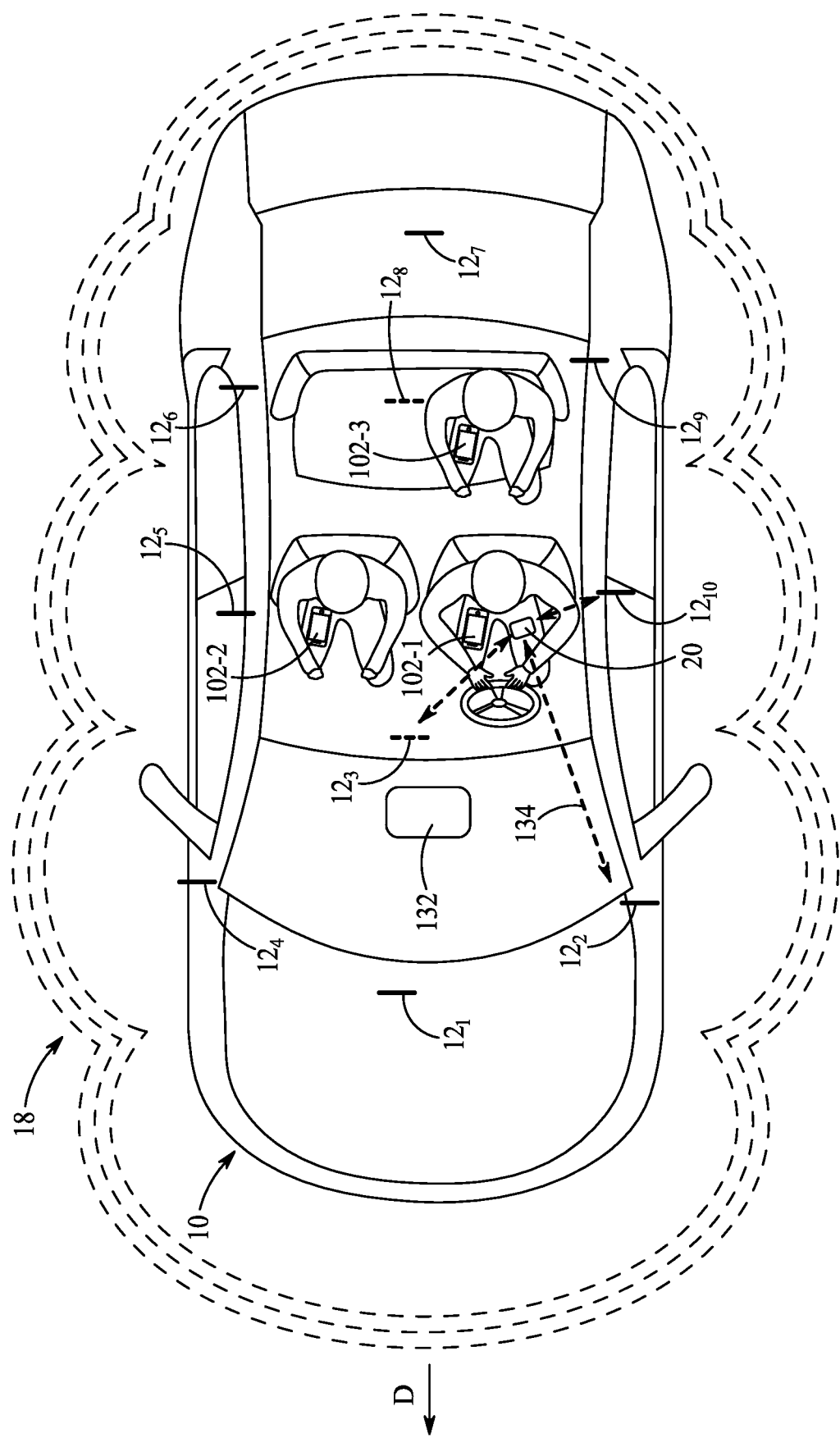
FIG. 1D depicts placement of ten antennas spaced about in a moving automobile.

FIG. 1D depicts ten antennas spaced about in a moving automobile 10.

As shown in FIG. 1D, the moving automobile 10 (travelling in the direction, D) includes a driver carrying the key fob 20 and smartphone 102-1. The moving automobile 10 also includes two passengers carrying smartphones 102-2 and 102-3, respectively.

Further, as can be seen in FIG. 1D, the moving automobile 10 includes ten antennas $12_1, 12_2, \ldots,$ and $12_{10}$ to receive the key fob signal and a controller 132 (for example, an electronic control unit (ECU) in an engine compartment which receives the antenna communications and generates the wakeup and other outgoing signals. The ten antennas $12_1, 12_2, \ldots,$ and $12_{10}$ are spaced about roof, sides, front, and back of the automobile 10. In an example, when a wake up signal is sent from the antennas $(12_1, 12_2, \ldots,$ and $12_{10})$ to the key fob 20, an electromagnetic field 18 is generated around the automobile 10. Further, each of the antennas $12_1, 12_2, \ldots,$ and $12_{10}$ may be in a bidirectional communication (two-way communication) with the key fob 20. For the sake of brevity, bidirectional communication between three antennas $12_2, 12_3,$ and $12_{10}$ and the key fob 20 is shown in FIG. 1D. As can be seen in FIG. 1D, a bidirectional signal 134 is shown between the antenna $12_2$ and the key fob 20.

In an aspect, each of the smartphones 102-1, 102-2, and 102-3 may include a driver control application 112 as shown in FIG. 1C. The driver control application 112 may be configured to communicate with the controller 132 to receive signal measurements in order to recognize an approaching key fob (such as key fob 20).

Figure 2A:
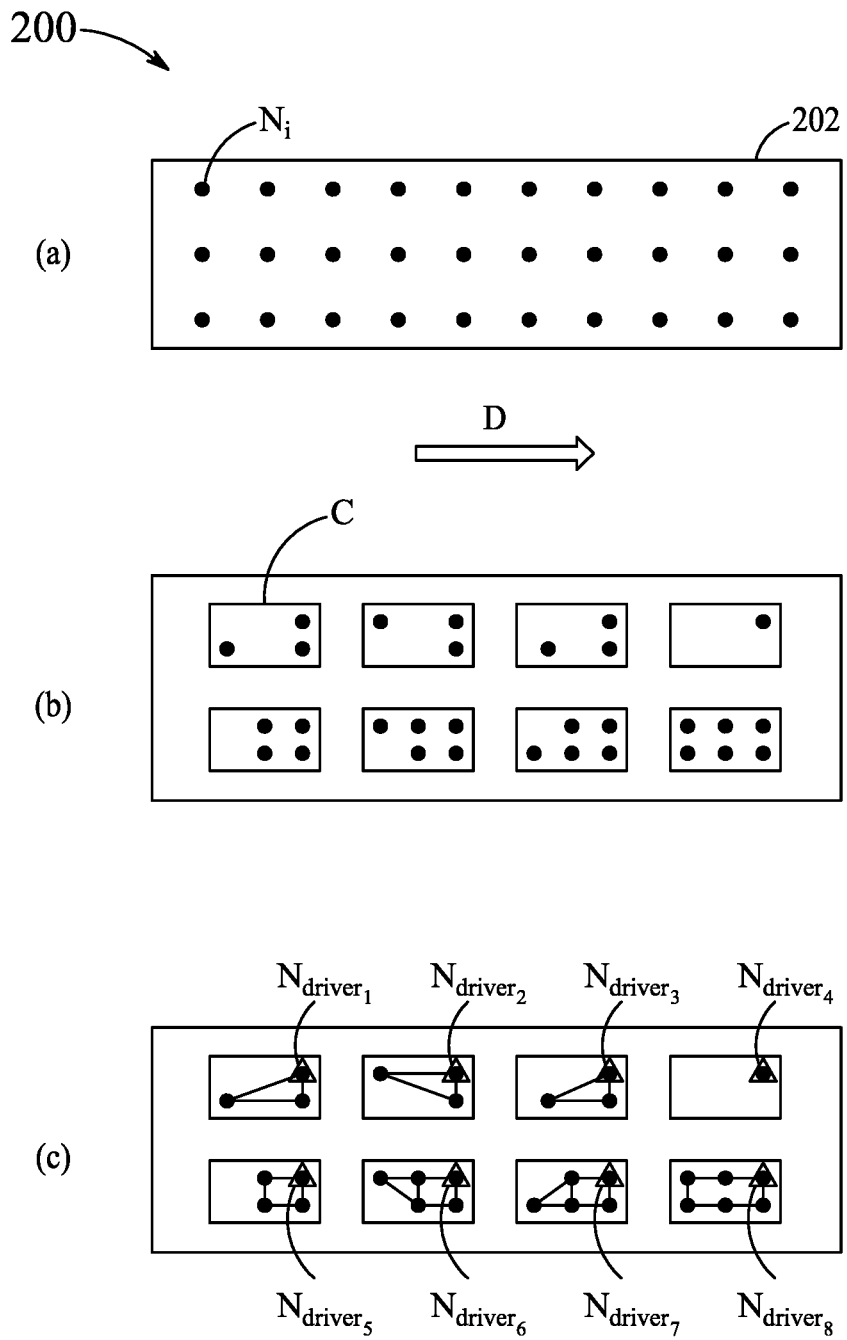
FIG. 2A depicts a process for determining the smartphone of a driver from amongst a plurality of smartphones located in a plurality of moving automobiles, according to exemplary aspects of the present disclosure.

FIG. 2A depicts a process 200 for determining the smartphone of a driver from amongst a plurality of smartphones located in a plurality of moving automobiles, according to exemplary aspects of the present disclosure.

According to some aspects of the present disclosure, a plurality of smartphones can be associated with the centralized monitor 104 in multiple ways. Whenever the centralized monitor 104 initiates monitoring and control of the smartphones, the computing circuitry 120 of the centralized monitor 104 may select a set of M smartphones, $S_i$, where $i=1, \ldots, M$. In the example of FIG. 2A(a), the computing circuitry 120 selects the set 202 of M=30 registered smartphones ($S_1, S_2, S_{29},$ and $S_{30}$) for monitoring and control purposes.

Upon selecting the set 202 of smartphones $S_i$, the computing circuitry 120 may retrieve a speed $p_i$ and a location $L_i$ from each smartphone $S_i$. In some aspects of the present disclosure, the computing circuitry 120 may apply graph theory to represent each smartphone $S_i$ as a node, $N_i$, in a graph. Thereafter, the computing circuitry 120 may identify at least one subset, P, of the nodes of smartphones of the set 202 which have identical speeds, $S_p$, where $p=1, \ldots,$ and travelling in the same direction, D. The computing circuitry 120 may then generate a group of clusters for all the nodes in the graph having identical speeds within a threshold distance of one another. The computing circuitry 120 may then identify at least one cluster, C, of nodes in the subset, P, having locations, L, within a threshold distance of one another, where $c=1, \ldots,$ C. As can be seen in FIG. 2A(b), the nodes are grouped into eight clusters and each cluster includes one or more nodes i.e., one or more smartphones. As would be understood, a single cluster represents an automobile including one or more smartphones.

In some aspects of the present disclosure, the computing circuitry 120 may analyze the clusters to determine at least one set of smartphones located within a particular moving automobile. Upon determining the at least one set of smartphones located within the particular moving automobile, the computing circuitry 120 may determine a smartphone of a driver from amongst the at least one set of smartphones based on determining a number of nodes (i.e. smartphones) in the cluster, C, and identifying a node, $N_{driver_j}$, within the cluster, C as shown in FIG. 2A(c), where $j=1, \ldots,$ N. The node, $N_{driver_j}$, may represent the smartphone of the driver of the particular moving automobile. In an aspect of the present disclosure, the computing circuitry 120 may determine the node, $N_{driver_j}$, based on the LF RFID, the measured RSSI (or the magnitude of the RSSI), and the number of nodes in the cluster, C.

In some aspects of the present disclosure, the computing circuitry 120 may determine the smartphone of the driver of the particular moving automobile within the cluster C by one or more of: determining there is only one node in the cluster C, determining a left most node in the cluster C when there are two nodes in the cluster C having the same latitude, determining a front left node in the cluster C, determining a right most node in the cluster C when there are two nodes in the cluster having the same latitude, determining a front right node in the cluster C, and determining highest RSSI signal strength of the nodes in the cluster C. According to some aspects of the present disclosure, the computing circuitry 120 may apply a geometrical analysis on the cluster C to determine the node, $N_{driver_j}$.

As shown in FIG. 2A(b), there are three nodes in the cluster C. The computing circuitry 120 may represent these three nodes geometrically as a triangle. In some aspects of the present disclosure, a distance between two nodes may be considered to determine that the smartphones may belong to the driver. For example, a threshold may be set to determine the distance between the smartphones. In an example aspect, if the distance between the two nodes is less than 0.5 meters, then both of the two smartphones may be considered to be owned by the driver. In such scenario, the centralized monitor 104 may prevent the driver from using both the smartphones.

In some aspects of the present disclosure, the computing circuitry 120 may determine which of the three nodes in the cluster C has the highest RSSI signal strength. In an example, the node having the highest RSSI signal strength is identified as the node $N_{driver_j}$. Further, in some examples, the computing circuitry 120 may determine the node, $N_{driver_j}$ based on whether the moving automobile of the user is a left-hand drive automobile or a right-hand side automobile. In an example, when the user is driving in the United States, it may be determined that the moving automobile of the user is a left-hand drive automobile. In such situations, the computing circuitry 120 may identify the left most node in the cluster C or the front left node in the cluster C to be the smartphone of the driver of the moving automobile. In FIG. 2A(c) the computing circuitry 120 identifies the driver positioned in the left most node (represented by $N_{driver_j}$) of a cluster.

Figure 2B:
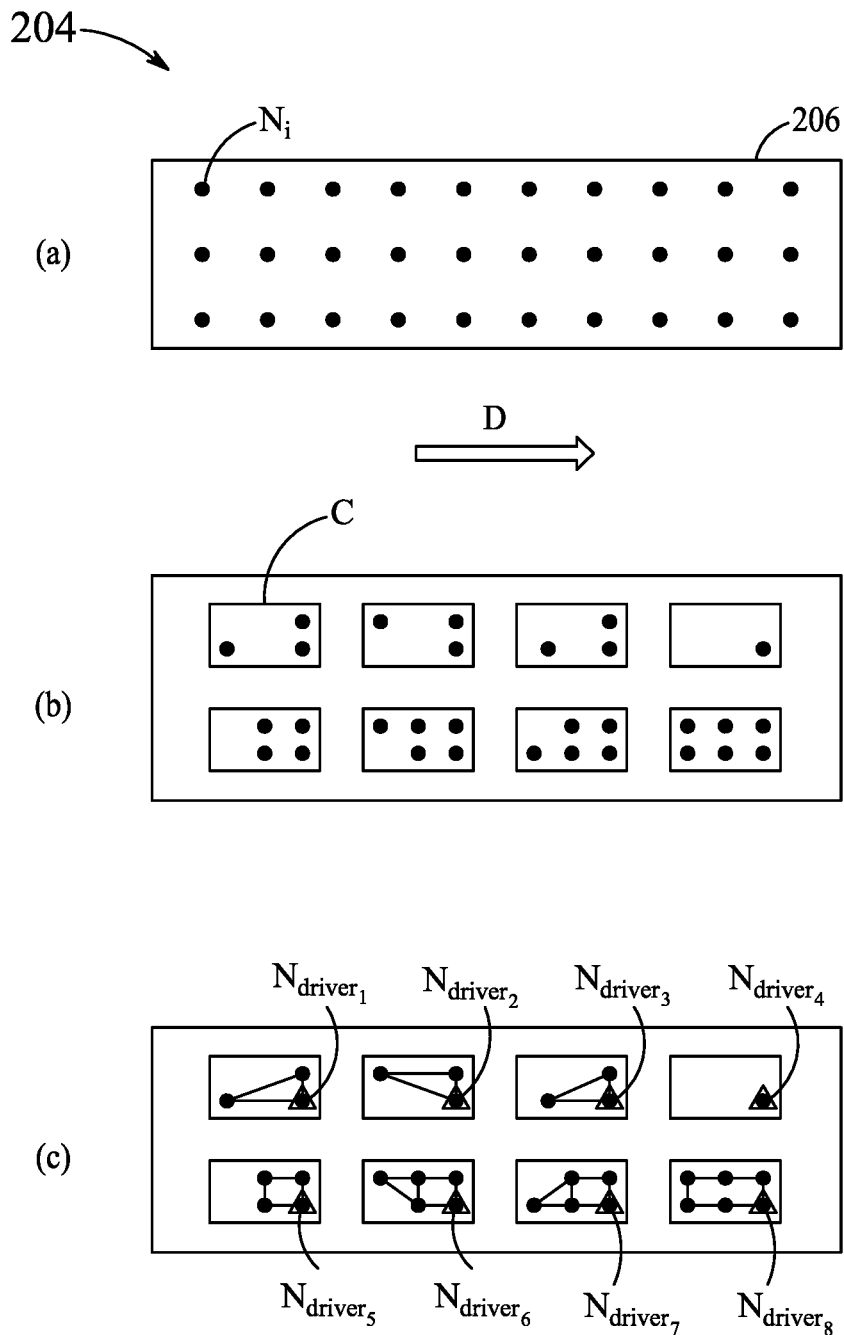
FIG. 2B depicts another process for determining the smartphone of a driver from amongst a plurality of smartphones located in a plurality of moving automobiles, according to exemplary aspects of the present disclosure.

FIG. 2B shows depicts another process 204 for determining the smartphone of a driver from amongst a set 206 of M smartphones located in a plurality of moving automobiles, according to exemplary aspects of the present disclosure. The process of identifying the driver is similar to the process described in the FIG. 2A. As can be seen in FIG. 2B(a), the computing circuitry 120 selects the set 202 of M=30 registered smartphones ($S_1, S_2, \ldots, S_{29}$, and $S_{30}$) for monitoring and control purposes. The computing circuitry 120 is programmed to identify the driver in a right front seat. In FIG. 2B(b), the clusters having nodes of constant speeds and locations within a threshold distance are created. The computing circuitry 120 analyzes each cluster to determine the node, $N_{driver_j}$, representing the driver of the moving automobile. In FIG. 2B(c), the computing circuitry 120 may determine the node, $N_{driver_j}$, based on the LF RFID, the measured RSSI (or the magnitude of the RSSI), and the number of nodes in the cluster, C. In an example, if the user is driving in Australia, then it may be determined that the moving automobile of the user is a right-hand drive automobile. If the automobile is driving in Australia, the computing circuitry 120 may identify the right most node in the cluster C or the front right node in the cluster C to be the smartphone of the driver of the moving automobile. As can be seen in FIG. 2B(c), the front right node in the cluster C is the node, $N_{driver_j}$. As can be seen in FIG. 2B(c), the front left node in the cluster C is the node, $N_{driver_j}$. In some examples, a moving automobile of the user being a left-hand drive automobile may enter territories or boundaries (for example during inter-country travel) where the moving automobile of the user are generally right-hand drive automobile. In such cases, the computing circuitry 120 may consider the fact that the moving automobile of the user is a left-hand drive automobile in the location having standard right-hand drive automobiles, and disables the smartphone of the driver.

The computing circuitry 120 may then determine whether the smartphone of the driver is registered with the centralized monitor 104. If it is determined that the smartphone of the driver is registered with the centralized monitor 104, the computing circuitry 120 may determine whether the speed of the particular moving automobile of the cluster C is greater than a threshold speed, T. If the speed of the particular moving automobile of the cluster C is greater than T, the computing circuitry 120 may transmit a control signal to the smartphone of the driver to block the smartphone of the driver from making calls, receiving calls, and/or accessing social media applications. In an example, the computing circuitry 120 may control the smartphone of the driver through the driver control application. In a similar manner as described above, the computing circuitry 120 analyzes all the clusters to determine node, $N_{driver_j}$ in each cluster.

Figure 3:
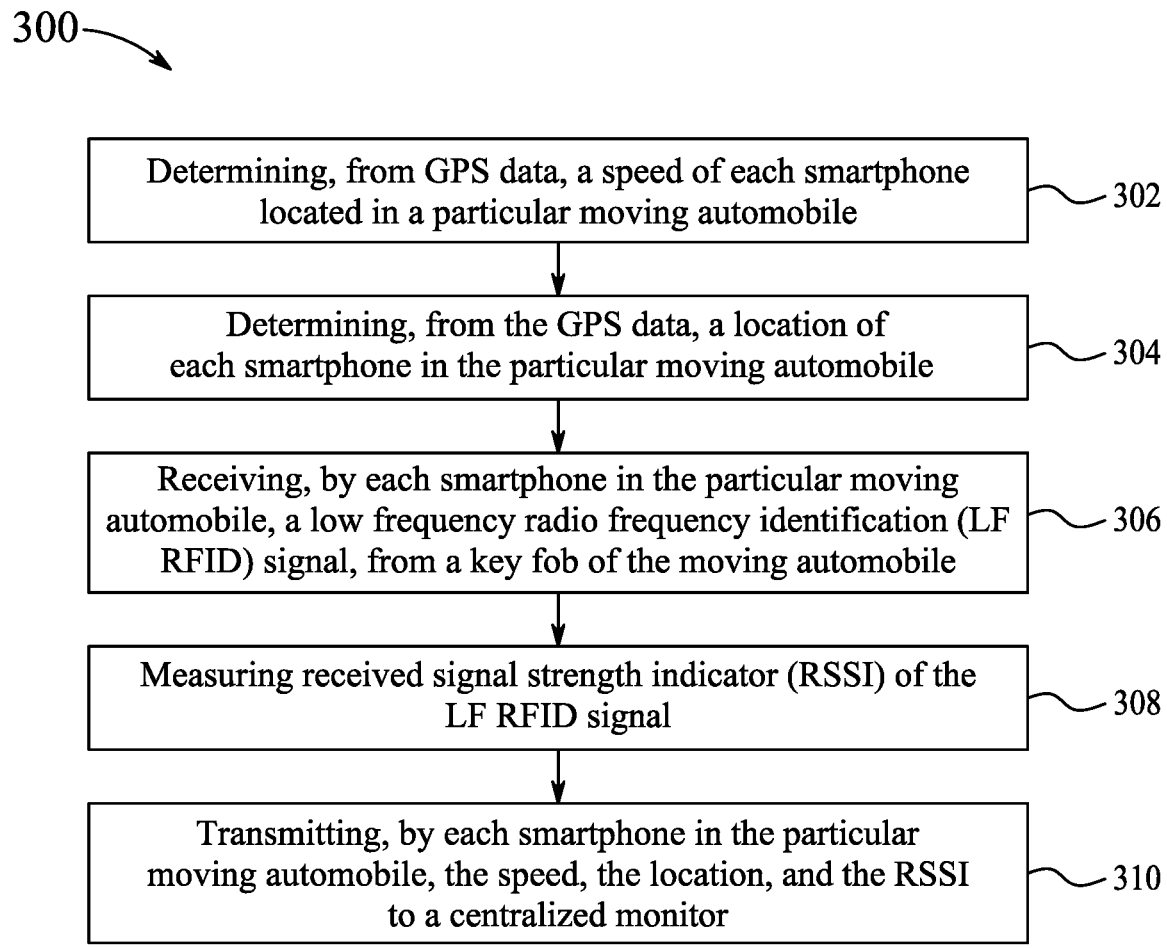
FIG. 3 illustrates a flowchart of a method for gathering data from smartphones to determine a smartphone of a driver of a moving automobile, according to exemplary aspects of the present disclosure.

FIG. 3 illustrates a flowchart of a method 300 for gathering data from smartphones to determine a smartphone of a driver of a moving automobile, according to exemplary aspects of the present disclosure.

At step 302, the method 300 includes determining, from GPS data, a speed of each smartphone located in a particular moving automobile.

At step 304, the method 300 includes determining, from the GPS data, a location of each smartphone in the particular moving automobile.

At step 306, the method 300 includes receiving, by each smartphone in the particular moving automobile, a low frequency radio frequency identification, LF RFID, signal from a key fob of the moving automobile. A key fob is a passive wireless electronic device that allows a driver of an automobile to control the automobile from a distance. A key fob typically uses RFID technology for locking, unlocking, and/starting an automobile. In an example, the key fob may emit LF RFID signals which may be received/detected by one or more antennas of the automobile and can also be detected by each smartphone in the automobile.

At step 308, the method 300 includes measuring a received signal strength indicator, RSSI, of the LF RFID signal. An RSSI of a signal may be a measurement of the strength of the signal being received. In an example, RSSI is a measurement of a power level received from the response LF RFID signal generated by the key fob when interrogated by antennas of the automobile. The higher the RSSI, the stronger the signal. In an example, the RSSI is measured in decibels (dB).

At step 310, the method 300 includes transmitting, by each user device, e.g., smartphone 102 configured with the driver control application 112 in the particular moving automobile, the speed, the location, and the RSSI to the centralized monitor 104.

Figure 4:
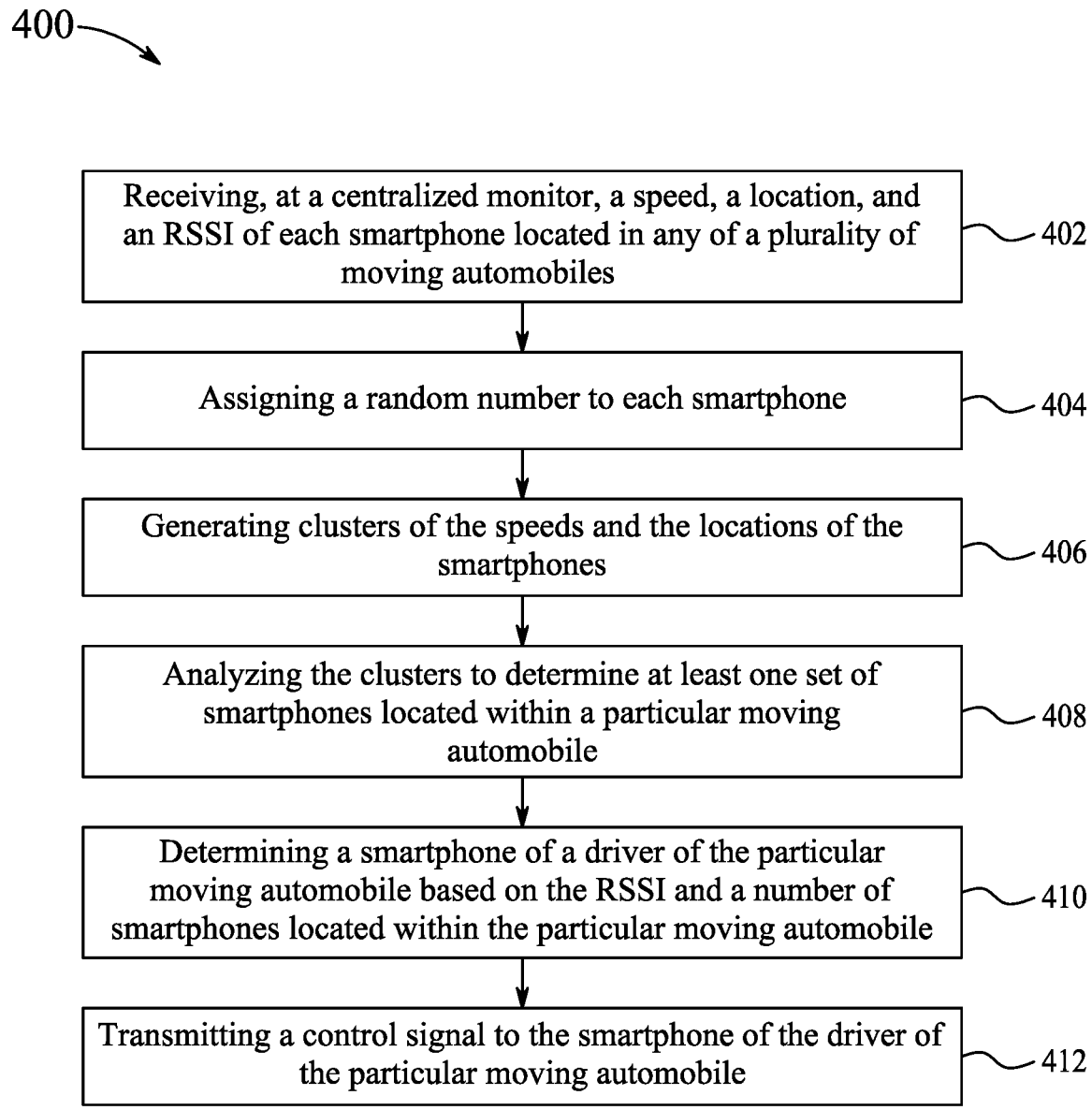
FIG. 4 illustrates a flowchart of a method for controlling smartphones of drivers of moving automobiles at a centralized monitor, according to exemplary aspects of the present disclosure.

FIG. 4 illustrates a flowchart of a method for controlling smartphones of drivers of moving automobiles at a centralized monitor, according to exemplary aspects of the present disclosure.

At step 402, the method 400 includes receiving, at the centralized monitor 104, a speed, a location, and an RSSI of each smartphone located in any of a plurality of moving automobiles At step 404, the method 400 includes assigning a random number to each smartphone. In an example, the centralized monitor 104 may assign a random number to each smartphone whether or not the smartphone is registered with the centralized monitor 104. According to some aspects of the present disclosure, the centralized monitor 104 may assign a random number to each smartphone that may interact with the centralized monitor 104 regardless of whether or not the smartphones are registered with the centralized monitor 104.

At step 406, the method 400 includes generating clusters of the speeds and the locations of the smartphones. In some aspects of the present disclosure, the centralized monitor 104 may use graph theory to represent each smartphone as a node on a graph and generate clusters of nodes having identical speeds within a threshold distance of one another.

At step 408, the method 400 includes analyzing the clusters to determine at least one set of smartphones located within a particular moving automobile.

At step 410, the method 400 includes determining a smartphone of a driver of the particular moving automobile based on the RSSI and a number of smartphones located within the particular moving automobile. In some aspects of the present disclosure, the centralized monitor 104 may identify the smartphone of the driver of the particular moving automobile within a cluster of nodes by one or more of: determining there is only one node in the cluster, determining a left most node in the cluster when there are two nodes in the cluster having the same latitude, determining a front left node in the cluster, and determining a highest RSSI signal strength of the nodes in the cluster.

At step 412, the method 400 includes transmitting a control signal to the smartphone of the driver of the particular moving automobile. In some aspects of the present disclosure, the control signal may be transmitted to block the smartphone from receiving calls, making calls, and/or accessing social media applications when a speed of a particular moving vehicle automobile is greater than a threshold value. In some aspects of the present disclosure, the control signal may be transmitted to actuate the smartphone to call an emergency service when a speed of the particular moving automobile rapidly decreases.

The first embodiment is illustrated with respect to FIGS. 1-8. The first embodiment describes a method for controlling smartphones of drivers of moving automobiles. The method includes determining, from GPS data, a speed of each smartphone located in a particular moving automobile; determining, from the GPS data, a location of each smartphone in the particular moving automobile; receiving, by each smartphone in the particular moving automobile, a low frequency radio frequency identification, LF RFID, signal from a key fob of the moving automobile; measuring a received signal strength indicator, RSSI, of the LF RFID signal; transmitting, by each smartphone in the particular moving automobile, the speed, the location, the LF RFID signal, and the RSSI to a centralized monitor; receiving, at the centralized monitor, the speed, the location, the LF RFID signal, and the RSSI of each smartphone located in any of a plurality of moving automobiles; assigning a random number to each smartphone; generating clusters of the speeds and the locations of the smartphones; analyzing the clusters to determine at least one set of smartphones located within a particular moving automobile; identifying a smartphone of a driver of the particular moving automobile based on the LF RFID signal, the RSSI, and a number of smartphones located within the particular moving automobile; and transmitting a control signal to the smartphone of the driver of the particular moving automobile.

The method comprises registering each smartphone with the centralized monitor and providing permissions to the centralized monitor to control the registered smartphone with a control signal.

The method comprises downloading a computer application from the centralized monitor to the registered smartphone, wherein the computer application can access controls of the registered smartphone.

The method further comprises transmitting, by the centralized monitor, a control signal configured to block the registered smartphone from receiving or making calls when the speed of the particular moving automobile is greater than a threshold value.

The method comprises transmitting, by the centralized monitor, a control signal configured to block the registered smartphone from accessing social media applications when the speed of the particular moving automobile is greater than a threshold value.

The method comprises transmitting, by the centralized monitor, a control signal configured to actuate the registered smartphone to call an emergency service when the speed of the particular moving automobile rapidly decreases.

The method comprises using graph theory, by the centralized monitor, to represent each smartphone as a node on a graph, generating clusters of nodes having identical speeds within a threshold distance of one another, identifying the smartphone of the driver of the particular moving automobile within a cluster of nodes by one or more of: determining there is only one node in the cluster, determining a left most node in the cluster when there are two nodes in the cluster having the same latitude, determining a front left node in the cluster, and determining a highest RSSI signal strength of the nodes in the cluster.

The generating clusters of the speeds and the locations of the smartphones by the centralized monitor comprises selecting a set, M, of smartphones, $S_i$, where i=1, M, retrieving the speed $p_i$ from each smartphone $S_i$, retrieving the location $L_i$ from each smartphone Si, applying graph theory to represent each smartphone $S_i$ as a node, $N_i$, in a graph, identifying at least one subset, P, of the nodes of smartphones of the set, M, which have identical speeds, $S_p$, where p=1, P, and identifying at least one cluster, C, of nodes in the set, P, having locations, $L_c$, within a threshold distance of one another, where c=1, . . . , C.

The analyzing the clusters to determine at least one set of smartphones located within the particular moving automobile and determining the smartphone of the driver includes determining a number of smartphones in the cluster, C, and identifying the node, $N_{driver}$, within the cluster, C, which represents the smartphone of the driver of the particular moving automobile, based on the LF RFID, the magnitude of the RSSI, and the number of nodes in the cluster, C.

The method comprises determining whether the smartphone of the driver is registered with the centralized monitor when the smartphone of the driver is registered with the centralized monitor, determining whether the speed of the particular moving automobile of the cluster C is greater than a threshold speed, T, if the speed of the particular moving automobile of the cluster C is greater than T, transmitting a control signal to the smartphone of the driver to block the smartphone of the driver from making calls, receiving calls and accessing social media applications.

The method comprises downloading a computer application from the centralized monitor to the registered smartphone of the driver, wherein the computer application can access controls of the registered smartphone, determining whether the speed of the particular moving automobile of the cluster C is greater than a threshold speed, T, if the speed of the particular moving automobile of the cluster C is greater than T, transmitting a control signal to the computer application on the smartphone of the driver to block the smartphone of the driver from making calls, receiving calls and accessing social media applications.

The method comprises receiving, by the smartphone of the driver, a component LF RFID signal from any one of an airbag sensor, a brake sensor, a tire sensor, an event data recorder, an accident data recorder, an electronic control unit alarm, a speed sensor indicating a sudden deceleration, transmitting the component LF RFID signal to the centralized monitor, analyzing, by the centralized monitor, the component LF RFID signal to determine whether the component LF RFID signal indicates an emergency situation, and calling, by the centralized monitor, an emergency unit when the emergency situation is indicated.

The second embodiment is illustrated with respect to FIGS. 1-8. The second embodiment describes a system for controlling smartphones of drivers of moving automobiles is described, comprising a plurality of smartphones, each smartphone located in a moving automobile, wherein each smartphone includes a GPS unit configured to record a speed and a location of the smartphone, a driver control application configured to control access to phone services and social media applications, a low frequency receiver configured to receive low frequency radio frequency identification, LF RFID, signal from a key fob located within the moving automobile, a computing unit configured to measure a received signal strength indicator, RSSI, of the LF RFID signal, a transmitter configured to transmit the speed, the location, the LF RFID signal, and the RSSI to a centralized monitor, wherein the centralized monitor includes a computing circuitry configured to receive the speed, the location, the LF RFID signal, and the RSSI of each smartphone located in any of a plurality of moving automobiles; assign a random number to each smartphone, generate clusters of the speeds and the locations of the smartphones, analyze the clusters to determine at least one set of smartphones located within a particular moving automobile, identify a smartphone of a driver of the particular moving automobile based on the LF RFID signal, the RSSI, and a number of smartphones located within the particular moving automobile, and transmit a control signal to the smartphone of the driver of the particular moving automobile.

The centralized monitor further includes a registration unit configured to register each smartphone with the centralized monitor and provide permissions to the centralized monitor to control the registered smartphone with a control signal.

The centralized monitor further includes a computer application, wherein the computer application is configured to be downloaded by each registered smartphone, and wherein the computer application is further configured to access controls of the registered smartphone.

The centralized monitor is further configured to control the registered smartphone by transmitting a control signal configured to: block the registered smartphone of the driver of the particular moving automobile from receiving or making calls when the speed of the particular moving automobile is greater than a threshold value; block the registered smartphone from accessing social media applications when the speed of the particular moving automobile is greater than a threshold value; and actuate the registered smartphone to call an emergency service when a speed of the particular moving automobile rapidly decreases.

The computing circuitry of the centralized monitor is further configured to use graph theory to represent each smartphone as a node on a graph, generate clusters of nodes having identical speeds within a threshold distance of one another, identify the smartphone of a driver of the particular moving vehicle within a cluster of nodes by one or more of: determining there is only one node in the cluster, determining a left most node in the cluster when there are two nodes in the cluster having the same latitude, determining a front left node in the cluster, and determining a highest RSSI signal strength of the nodes in the cluster.

The computing circuitry of the centralized monitor is further configured to generate clusters of the speeds and the locations of the smartphones by: selecting a set, M, of smartphones, $S_i$, where i=1, M, retrieving the speed $p_i$ from each smartphone $S_i$, retrieving the location $L_i$ from each smartphone Si, applying graph theory to represent each smartphone $S_i$ as a node, $N_i$, in a graph, identifying at least one subset, P, of the nodes of smartphones of the set, M, which have identical speeds, $S_p$, where p=1, P, identifying at least one cluster, C, of nodes in the set, P, having locations, $L_c$, within a threshold distance of one another, where c=1, . . . , C, analyze the clusters to determine at least one set of smartphones located within the particular moving automobile and determining the smartphone of the driver by: determining a number of smartphones in the cluster, C, identifying the node, $N_{driver}$, within the cluster, C, which represents the smartphone of the driver of the particular moving vehicle, based on the LF RFID, the magnitude of RSSI, and the number of nodes in the cluster, C, determine whether the smartphone of the driver is registered with the centralized monitor, when the smartphone of the driver is registered with the centralized monitor, determine whether the speed of the particular moving vehicle of the cluster C is greater than a threshold speed, T, and if the speed of the particular moving vehicle of the cluster C is greater than T, transmit a control signal to the smartphone of the driver to block the smartphone of the driver from making calls, receiving calls and accessing social media applications.

The system further comprising an LF RFID receiver on the smartphone of the driver, wherein the receiver is configured to receive a component LF RFID signal from any one of an airbag sensor, a brake sensor, a tire sensor, an event data recorder, an accident data recorder, an electronic control unit alarm, a speed sensor indicating a sudden deceleration, wherein the transmitter of the smartphone of the driver is configured to transmit the component LF RFID signal to the centralized monitor, wherein the centralized monitor is further configured to analyze the component LF RFID signal to determine whether the component LF RFID signal indicates an emergency situation, and call an emergency unit when the emergency situation is indicated.

The third embodiment is illustrated with respect to FIGS. 1-8. The third embodiment describes a non-transitory computer readable medium having instructions stored therein that, when executed by one or more processors, cause the one or more processors to perform a method for controlling smartphones of drivers of moving automobiles, comprising: receiving, at a centralized monitor, a speed, a location, and a received signal strength indicator, RSSI, of each smartphone located in any of a plurality of moving automobiles, assigning a random number to each smartphone, generating clusters of the speeds and the locations of the smartphones, analyzing the clusters to determine at least one set of smartphones located within a particular moving automobile, identifying a smartphone of a driver of the particular moving automobile based on the RSSI and a number of smartphones located within the particular moving automobile, and transmitting a control signal to the smartphone of the driver of the particular moving automobile.

Figure 5:
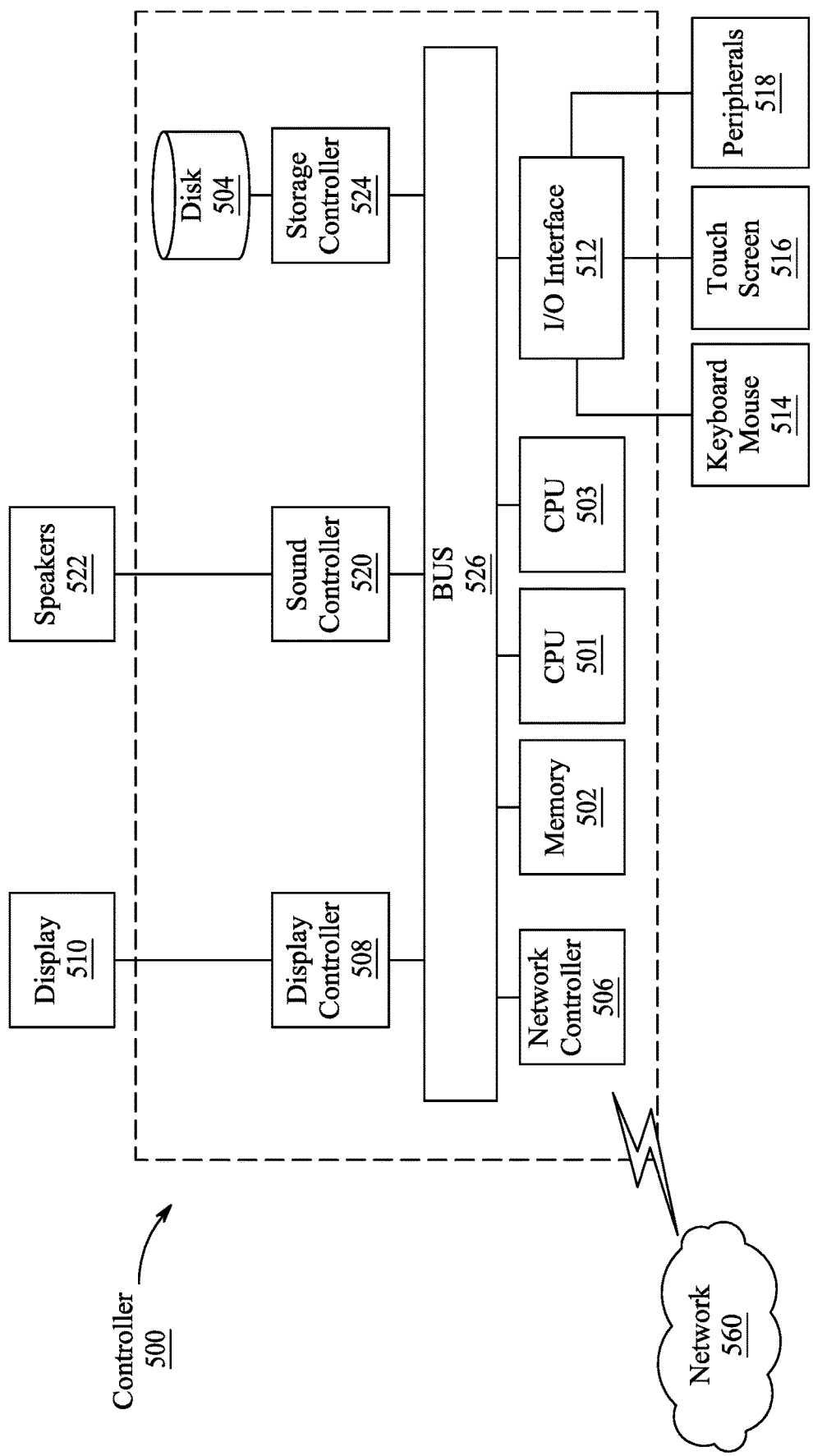
FIG. 5 is an illustration of a non-limiting example of details of computing hardware used in the computing system, according to exemplary aspects of the present disclosure.

FIG. 5 is an illustration of a non-limiting example of details of computing hardware used in the computing system, according to exemplary aspects of the present disclosure. In FIG. 5, a controller 500 is described which is a computing device and includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN subnetworks. The network 560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general-purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
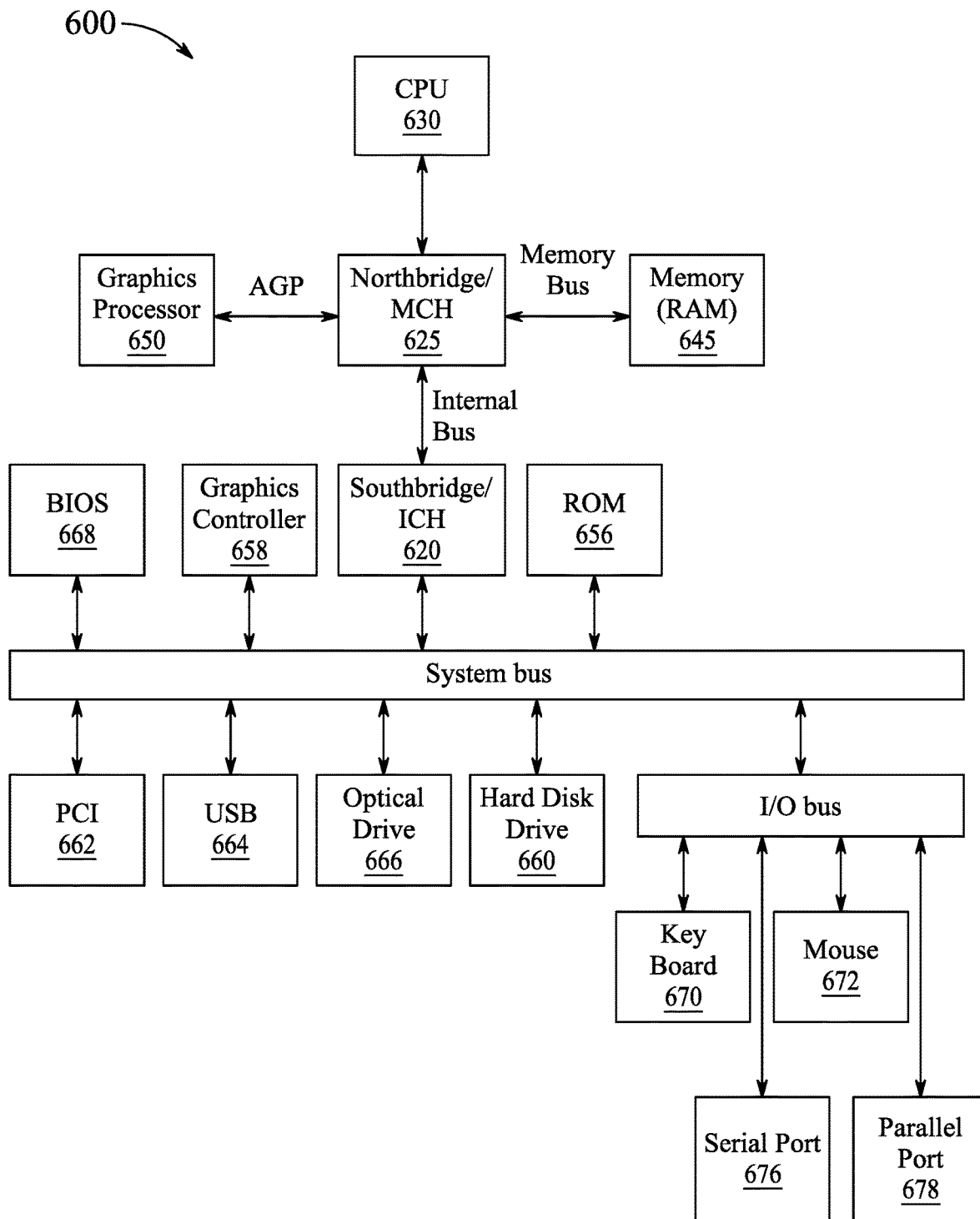
FIG. 6 is an exemplary schematic diagram of a data processing system used within the computing system, according to exemplary aspects of the present disclosure.

FIG. 6 shows a schematic diagram of a data processing system 600 used within the computing system, according to exemplary aspects of the present disclosure. The data processing system 600 is an example of a computer in which code or instructions implementing the processes of the illustrative aspects of the present disclosure may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
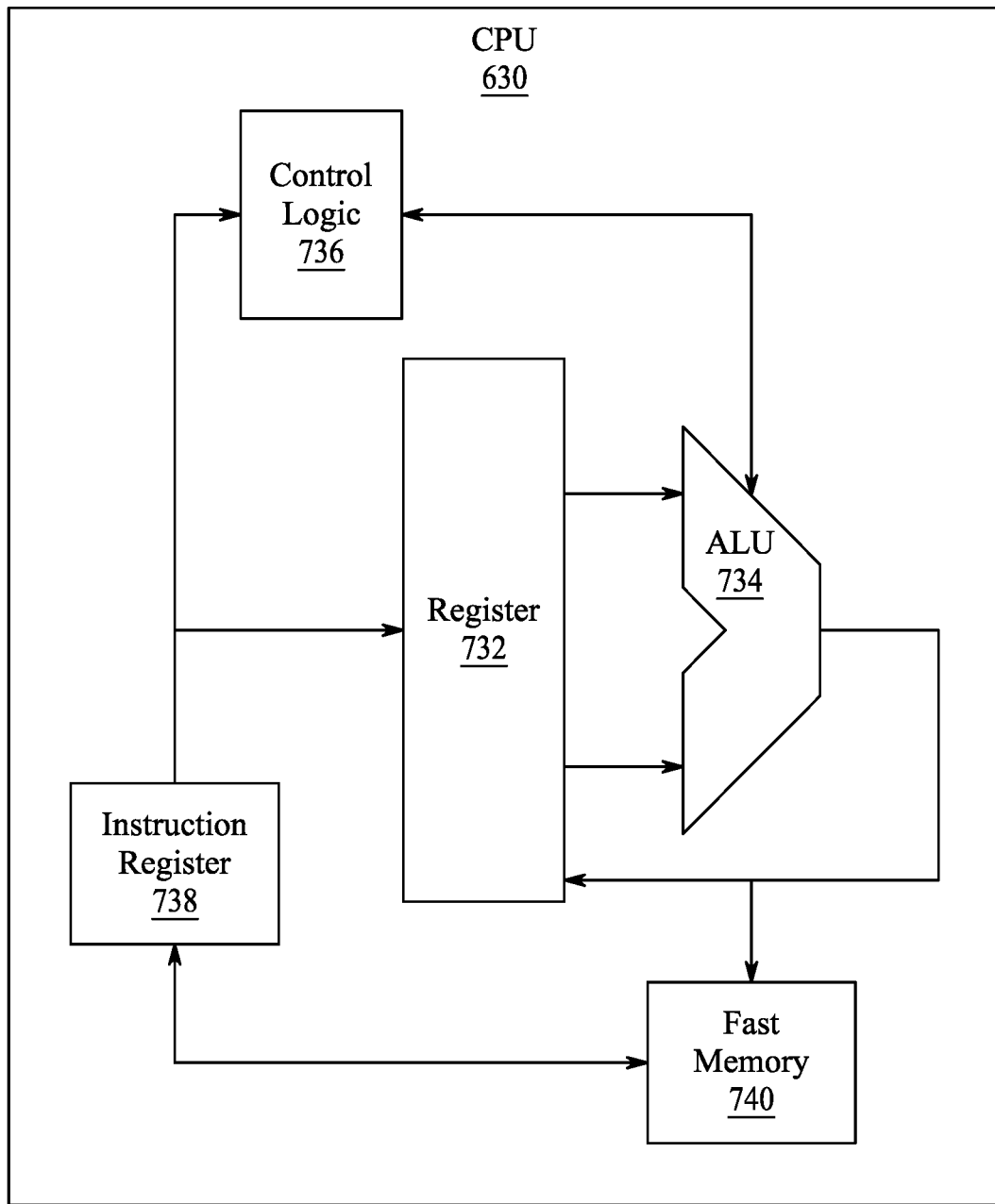
FIG. 7 is an exemplary schematic diagram of a processor used with the computing system, according to exemplary aspects of the present disclosure.

For example, FIG. 7 shows one aspects of the present disclosure of CPU 630. In one aspects of the present disclosure, the instruction register 738 retrieves instructions from the fast memory 740. At least part of these instructions is fetched from the instruction register 738 by the control logic 736 and interpreted according to the instruction set architecture of the CPU 730. Part of the instructions can also be directed to the register 730. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain aspects of the present disclosures, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 600 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices may include, for example, Ethernet adapters, add-in cards, and PC cards for notebook computers. The Hard disk drive 760 and CD-ROM 756 can use, for example, an integrated drive electronics (IDE) or serial advanced technology attachment (SATA) interface. In one aspects of the present disclosure the I/O bus can include a super I/O (SIO) device.

Further, the hard disk drive (HDD) 760 and optical drive 766 can also be coupled to the SB/ICH 720 through a system bus. In one aspects of the present disclosure, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
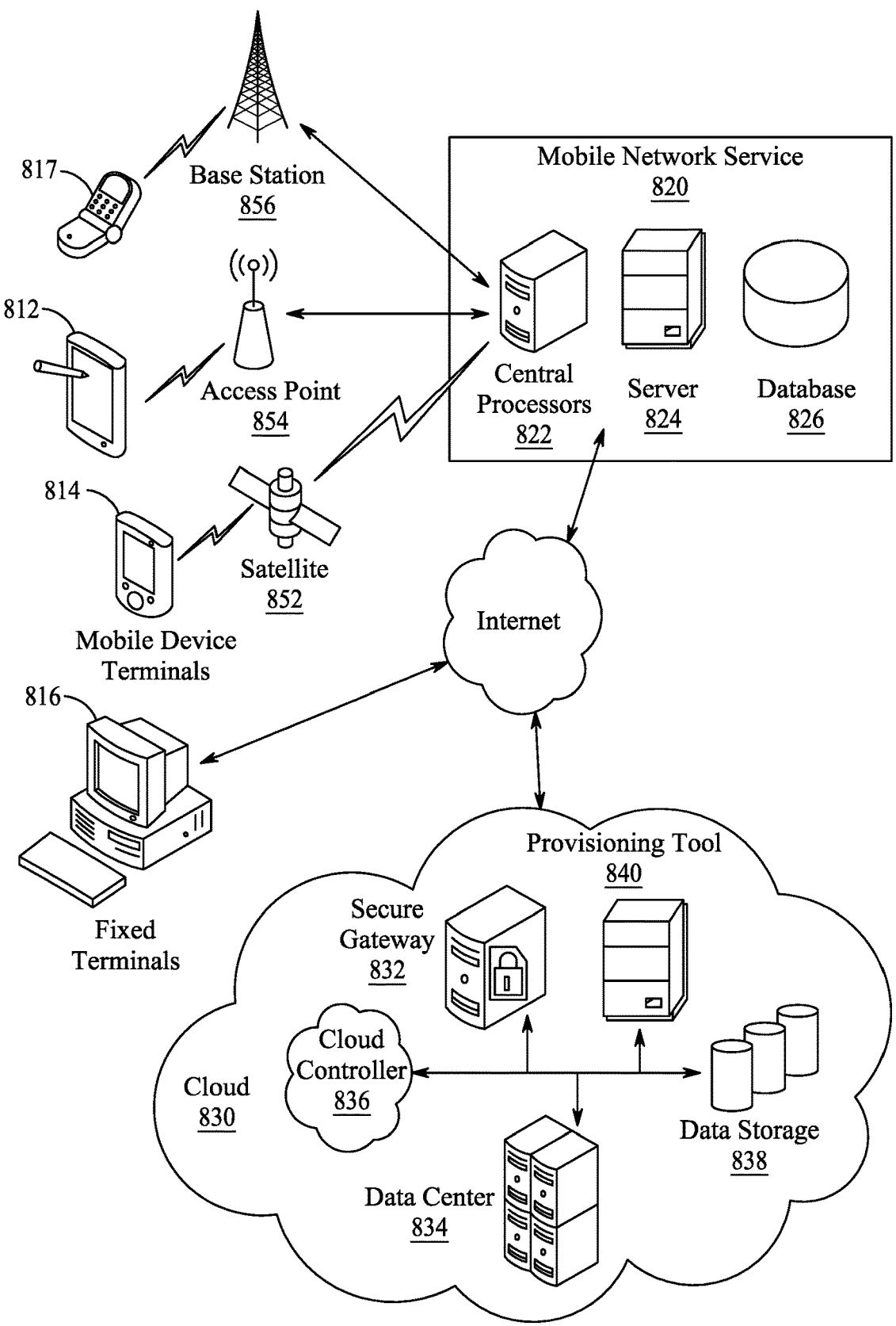
FIG. 8 is an illustration of a non-limiting example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for controlling smartphones of drivers of moving automobiles, comprising:
   determining, from GPS data, a speed of each smartphone located in a particular moving automobile;
   determining, from the GPS data, a location of each smartphone in the particular moving automobile;
   receiving, by each smartphone in the particular moving automobile, a low frequency radio frequency identification, LF RFID, signal from a key fob of the moving automobile;
   measuring a received signal strength indicator, RSSI, of the LF RFID signal;
   transmitting, by each smartphone in the particular moving automobile, the speed, the location, the LF RFID signal, and the RSSI to a centralized monitor;
   receiving, at the centralized monitor, the speed, the location, the LF RFID signal, and the RSSI of each smartphone located in any of a plurality of moving automobiles;
   assigning a random number to each smartphone;
   generating clusters of the speeds and the locations of the smartphones;
   analyzing the clusters to determine at least one set of smartphones located within a particular moving automobile;
   identifying a smartphone of a driver of the particular moving automobile based on the LF RFID signal, the RSSI, and a number of smartphones located within the particular moving automobile; and
   wirelessly transmitting a control signal to the smartphone of the driver of the particular moving automobile,
   registering each smartphone with the centralized monitor;
   providing permissions to the centralized monitor to control the registered smartphone with a control signal;
   downloading a computer application from the centralized monitor to the registered smartphone, wherein the computer application can access controls of the registered smartphone; then
   wherein the control signal is at least one of a control signal configured to block the registered smartphone from receiving or making calls when the speed of the particular moving automobile is greater than a threshold value, a control signal configured to block the registered smartphone from accessing social media applications when the speed of the particular moving automobile is greater than a threshold value, a control signal configured to actuate the registered smartphone to call an emergency service when the speed of the particular moving automobile rapidly decreases, and a control signal configured to actuate the registered smartphone to call an emergency service when the speed of the particular moving automobile rapidly decrease.

2. The method of claim 1, further comprising:
   using graph theory, by the centralized monitor, to represent each smartphone as a node on a graph;
   generating clusters of nodes having identical speeds within a threshold distance of one another;
   identifying the smartphone of the driver of the particular moving automobile within a cluster of nodes by one or more of:
      determining there is only one node in the cluster;
      determining a left most node in the cluster when there are two nodes in the cluster having the same latitude;
      determining a front left node in the cluster; and
      determining a highest RSSI signal strength of the nodes in the cluster.

3. The method of claim 1, wherein generating clusters of the speeds and the locations of the smartphones by the centralized monitor comprises:
   selecting a set, M, of smartphones, $S_i$, where i=1, ..., M;
   retrieving the speed $p_i$ from each smartphone $S_i$;
   retrieving the location $L_i$ from each smartphone Si;
   applying graph theory to represent each smartphone $S_i$ as a node, $N_i$, in a graph;
   identifying at least one subset, P, of the nodes of smartphones of the set, M, which have identical speeds, $S_p$, where p=1, ..., P; and
   identifying at least one cluster, C, of nodes in the set, P, having locations, $L_c$, within a threshold distance of one another, where c=1, ..., C.

4. The method of claim 3, wherein analyzing the clusters to determine at least one set of smartphones located within the particular moving automobile and determining the smartphone of the driver includes:
   determining a number of smartphones in the cluster, C; and
   identifying the node, $N_{drive}$, within the cluster, C, which represents the smartphone of the driver of the particular moving automobile, based on the LF RFID, the magnitude of the RSSI, and the number of nodes in the cluster, C.

5. The method of claim 4, further comprising:
   determining whether the smartphone of the driver is registered with the centralized monitor;
   when the smartphone of the driver is registered with the centralized monitor, determining whether the speed of the particular moving automobile of the cluster C is greater than a threshold speed, T;
   if the speed of the particular moving automobile of the cluster C is greater than T, transmitting a control signal to the smartphone of the driver to block the smartphone of the driver from making calls, receiving calls and accessing social media applications.

6. The method of claim 4, further comprising:
   downloading a computer application from the centralized monitor to the registered smartphone of the driver, wherein the computer application can access controls of the registered smartphone;

determining whether the speed of the particular moving automobile of the cluster C is greater than a threshold speed, T;

if the speed of the particular moving automobile of the cluster C is greater than T, transmitting a control signal to the computer application on the smartphone of the driver to block the smartphone of the driver from making calls, receiving calls and accessing social media applications.

7. The method of claim 6, further comprising:

receiving, by the smartphone of the driver, a component LF RFID signal from any one of an airbag sensor, a brake sensor, a tire sensor, an event data recorder, an accident data recorder, an electronic control unit alarm, a speed sensor indicating a sudden deceleration;

transmitting the component LF RFID signal to the centralized monitor;

analyzing, by the centralized monitor, the component LF RFID signal to determine whether the component LF RFID signal indicates an emergency situation; and calling, by the centralized monitor, an emergency unit when the emergency situation is indicated.

\* \* \* \* \*